United States Patent [19]
Kane et al.

[11] Patent Number: 5,441,338
[45] Date of Patent: Aug. 15, 1995

[54] SNAP-ON SHELF

[75] Inventors: Edmund J. Kane, Holland; Robert S. Herrmann, Grand Haven; Donald C. Gilbert, Muskegon Heights, all of Mich.

[73] Assignee: Donnelly Corporation, Holland, Mich.

[21] Appl. No.: 920,391

[22] Filed: Jul. 27, 1992

Related U.S. Application Data

[63] Continuation-in-part of Ser. No. 665,661, Mar. 7, 1991, Pat. No. 5,362,145, Ser. No. 721,104, Jun. 25, 1991, Pat. No. 5,273,354, and Ser. No. 912,778, Jul. 13, 1992, abandoned.

[51] Int. Cl.$^6$ ............................................. F25D 11/00
[52] U.S. Cl. ..................................... 312/408; 108/159
[58] Field of Search .......... 312/408, 410, 132, 334.46, 312/334.34; 108/159, 144, 152, 108, 110; 311/180, 187, 193, 134, 135

[56] References Cited

U.S. PATENT DOCUMENTS

| | | |
|---|---|---|
| D. 295,950 | 5/1988 | Johnston . |
| D. 310,623 | 9/1990 | Aranibar . |
| 392,061 | 10/1888 | Peckham . |
| 560,884 | 5/1896 | Anderson . |
| 786,935 | 4/1905 | Wright . |
| 870,439 | 11/1907 | Kade . |
| 894,711 | 7/1908 | Worcester . |
| 907,423 | 12/1908 | Tilley . |
| 1,119,982 | 12/1914 | Ohnstrand . |
| 1,774,312 | 8/1930 | Braeutigam . |
| 1,779,236 | 10/1930 | Hoegger . |
| 1,805,584 | 5/1931 | Kemp . |
| 1,878,072 | 9/1932 | Vance . |
| 1,961,391 | 6/1934 | Reedy et al. . |
| 1,973,416 | 9/1934 | Otte . |
| 1,973,829 | 9/1934 | Tobold . |
| 2,021,464 | 11/1935 | Rickard et al. . |
| 2,065,391 | 12/1936 | Nance . |
| 2,093,137 | 9/1937 | Reeves . |
| 2,144,602 | 1/1939 | Balmer . |
| 2,169,295 | 8/1939 | Shuart . |
| 2,197,982 | 4/1940 | O'Brien . |
| 2,252,997 | 8/1941 | Vanderveld . |
| 2,505,322 | 4/1950 | Drake . |
| 2,517,725 | 8/1950 | Schweller . |
| 2,537,804 | 1/1951 | Watkins . |
| 2,568,153 | 9/1951 | Hickman . |
| 2,599,607 | 6/1952 | Burrise . |
| 2,604,375 | 7/1952 | Beckett . |
| 2,613,818 | 10/1952 | Richard . |
| 2,626,773 | 1/1953 | Backman . |
| 2,657,894 | 12/1953 | Sklenar . |
| 2,681,786 | 6/1954 | Sparring . |

(List continued on next page.)

FOREIGN PATENT DOCUMENTS

| | | |
|---|---|---|
| 238288 | 10/1960 | Australia . |
| 638205 | 10/1963 | Belgium . |
| 651228 | 7/1964 | Belgium . |
| 711879 | 6/1965 | Canada . |

(List continued on next page.)

Primary Examiner—Peter R. Brown
Assistant Examiner—Gerald Anderson
Attorney, Agent, or Firm—Price, Heneveld, Cooper, DeWitt & Litton

[57] ABSTRACT

A snap-on shelf for use in a refrigerator has a shelf panel with a perimeter edge and a perimeter rim molded about the perimeter edge. Attachment clips are molded in one piece with the perimeter rim and releasably couple with a support frame for supporting the shelf panel. In one embodiment, attachment clips may be arranged at front and back rim regions for a fixed shelf configuration. In an alternative embodiment, attachment clips may be arranged at left and right sides of the perimeter rim and slidingly engage the frame for a sliding shelf configuration. Further, the shelf panel may be a separate piece from the perimeter rim or may alternatively be molded in one piece with the perimeter rim and the attachment clips. As another option, a slide for receiving and supporting a separate member in sliding engagement under the shelf panel may be used. As a further option, the attachment clips and perimeter rim may be adapted for use with a preexisting support frame.

70 Claims, 17 Drawing Sheets

U.S. PATENT DOCUMENTS

| | | |
|---|---|---|
| 2,689,778 | 9/1954 | Chambers et al. . |
| 2,735,741 | 2/1956 | Laben . |
| 2,739,777 | 3/1956 | Schoenhardt . |
| 2,834,478 | 5/1958 | Macdonald . |
| 2,857,227 | 10/1958 | Jacques . |
| 2,935,035 | 5/1960 | Chamberlin . |
| 2,949,193 | 8/1960 | Mather . |
| 2,954,125 | 9/1960 | Husted . |
| 2,975,908 | 3/1961 | Huet . |
| 3,028,638 | 4/1962 | Goellner . |
| 3,082,880 | 3/1963 | Mapson . |
| 3,092,047 | 6/1963 | Chesley . |
| 3,102,499 | 9/1963 | Shelor . |
| 3,120,077 | 2/1964 | Stoffel . |
| 3,127,146 | 3/1964 | Fisher . |
| 3,185,315 | 5/1965 | Andreassen . |
| 3,212,836 | 10/1965 | Johnson . |
| 3,220,364 | 11/1965 | Sandin . |
| 3,224,081 | 12/1965 | Richter . |
| 3,234,897 | 2/1966 | Berk . |
| 3,270,404 | 9/1966 | Andreassenn . |
| 3,294,351 | 12/1966 | Rollins, Jr. . |
| 3,308,961 | 3/1967 | Chesley . |
| 3,321,089 | 5/1967 | Krikorian . |
| 3,329,281 | 7/1967 | Ball . |
| 3,331,646 | 7/1967 | Peters . |
| 3,339,994 | 9/1967 | Reddig et al. . |
| 3,352,431 | 11/1967 | Smith . |
| 3,363,390 | 1/1968 | Crane et al. . |
| 3,429,628 | 2/1969 | Laszlo . |
| 3,446,361 | 5/1969 | Douty . |
| 3,511,193 | 5/1970 | Schild . |
| 3,554,383 | 1/1971 | Ball . |
| 3,561,714 | 2/1971 | Zurawski et al. . |
| 3,575,484 | 4/1971 | Kesling . |
| 3,603,274 | 9/1971 | Ferdinand et al. . |
| 3,604,669 | 9/1971 | Asher . |
| 3,633,983 | 1/1972 | Whitcomb . |
| 3,635,355 | 1/1972 | Kronenberger . |
| 3,637,085 | 1/1972 | Ball . |
| 3,672,624 | 6/1972 | Keller . |
| 3,701,325 | 10/1972 | Fenwick . |
| 3,862,784 | 1/1975 | Heinrich . |
| 3,865,448 | 2/1975 | Winterheimer . |
| 3,912,085 | 10/1975 | Cooke et al. . |
| 3,984,163 | 10/1976 | Boorman, Jr. et al. . |
| 3,993,002 | 11/1976 | Stroh . |
| 4,015,543 | 4/1977 | Stankowitz . |
| 4,018,167 | 4/1977 | Spangler . |
| 4,072,340 | 2/1978 | Morgan . |
| 4,139,234 | 2/1979 | Morgan . |
| 4,167,259 | 9/1979 | Bury . |
| 4,174,486 | 11/1979 | Winkler . |
| 4,242,848 | 1/1981 | Schoultz . |
| 4,312,086 | 1/1982 | Bianco . |
| 4,416,380 | 11/1983 | Flum . |
| 4,462,646 | 7/1984 | Fleck . |
| 4,543,283 | 9/1985 | Curtze et al. . |
| 4,548,327 | 10/1985 | Kilkelly . |
| 4,601,226 | 7/1986 | McClintock . |
| 4,603,781 | 8/1986 | Ryan, Jr. . |
| 4,627,201 | 12/1986 | Hamamoto et al. . |
| 4,723,809 | 2/1988 | Kida et al. . |
| 4,729,613 | 3/1888 | Tromble et al. . |
| 4,735,325 | 4/1988 | Remmers . |
| 4,735,470 | 4/1988 | Falk . |
| 4,736,918 | 4/1988 | Bessinger . |
| 4,736,997 | 4/1988 | Besore et al. . |
| 4,760,930 | 8/1988 | Fox . |
| 4,777,888 | 10/1988 | Waterman et al. . |
| 4,779,939 | 10/1988 | Stich . |
| 4,822,656 | 4/1989 | Hutter, III . |
| 4,841,698 | 6/1989 | Gold . |
| 4,870,907 | 10/1989 | McKee . |
| 4,890,746 | 1/1990 | Trulaske, Sr. . |
| 4,923,260 | 5/1990 | Poulsen . |
| 4,938,442 | 7/1990 | Mastrodicase . |
| 4,943,541 | 6/1990 | Bussan et al. . |
| 4,955,486 | 9/1990 | Trulaske, Sr. . |
| 5,004,202 | 4/1991 | Stumpf et al. . |
| 5,004,302 | 4/1991 | Stocking et al. . |
| 5,069,408 | 12/1991 | Bessinger . |
| 5,076,443 | 12/1991 | Trulaske, Sr. . |

FOREIGN PATENT DOCUMENTS

| | | |
|---|---|---|
| 780197 | 3/1968 | Canada . |
| 0507455A2 | 7/1992 | European Pat. Off. . |
| 1311065 | 12/1962 | France . |
| 1346778 | 11/1963 | France . |
| 2111257 | 6/1972 | France . |
| 2269891 | 5/1975 | France . |
| 2466724 | 4/1981 | France . |
| 711920 | 9/1941 | Germany . |
| 2629118 | 1/1978 | Germany . |
| 85357952 | 3/1986 | Germany . |
| 90065131 | 9/1990 | Germany . |
| 90041801 | 8/1991 | Germany . |
| 202774 | 6/1965 | Sweden . |
| 320487 | 11/1929 | United Kingdom . |
| 324990 | 2/1930 | United Kingdom . |
| 908454 | 10/1960 | United Kingdom . |
| 1002175 | 7/1962 | United Kingdom . |
| 1020988 | 2/1966 | United Kingdom . |
| 1168332 | 10/1969 | United Kingdom . |

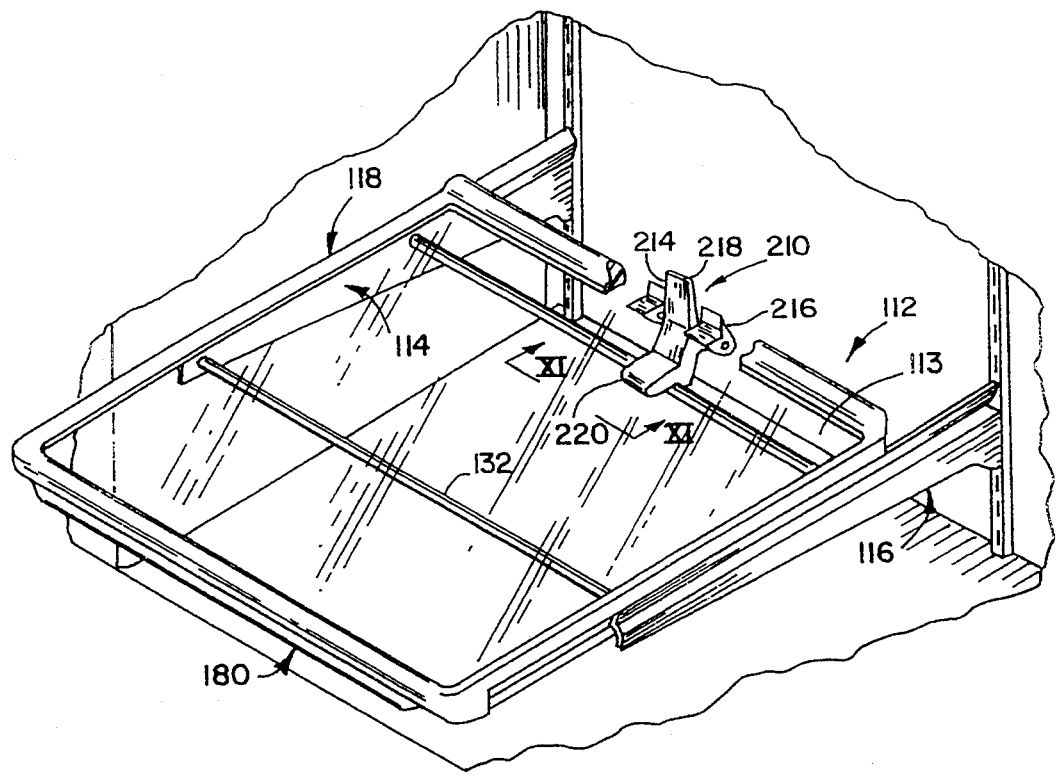
FIG. 10
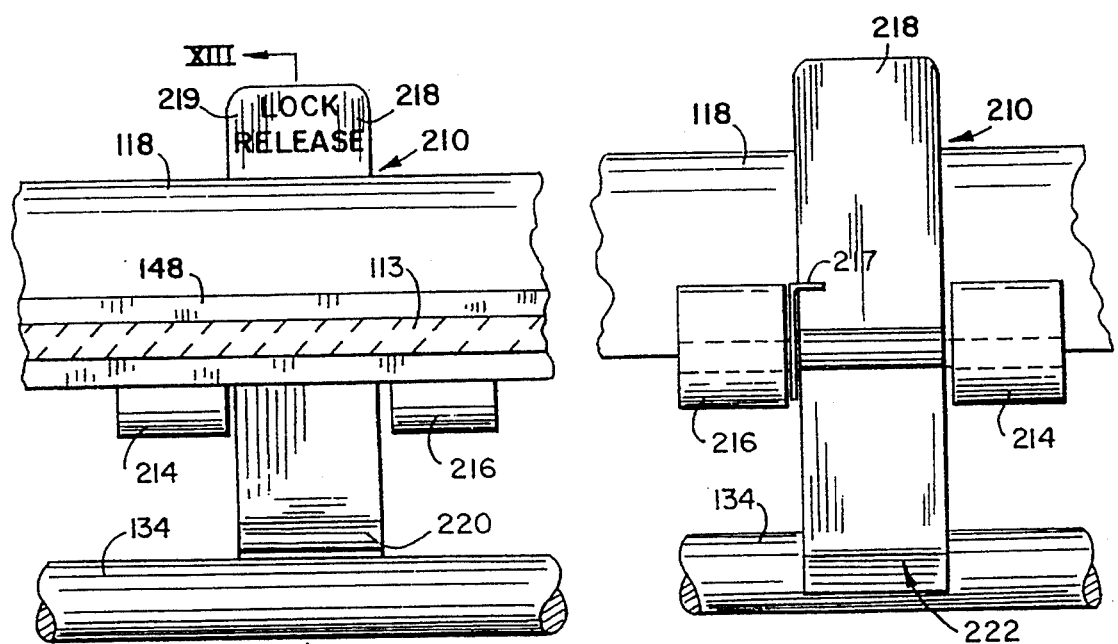
FIG. 11
FIG. 12

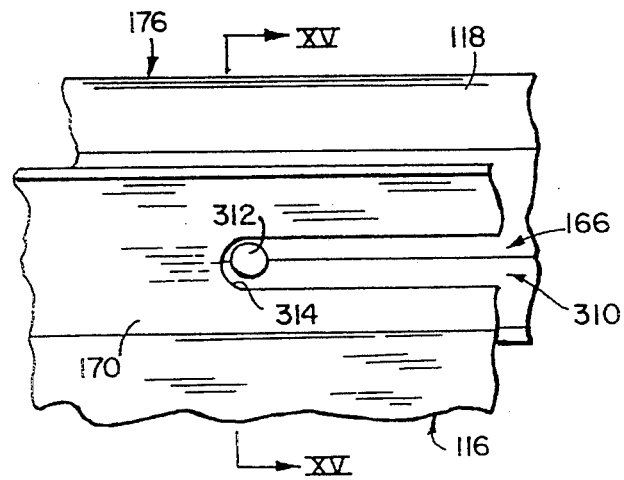
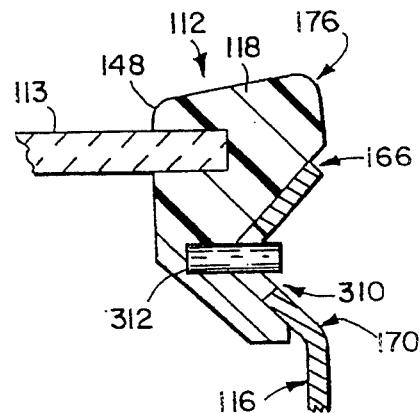
FIG. 14
FIG. 15
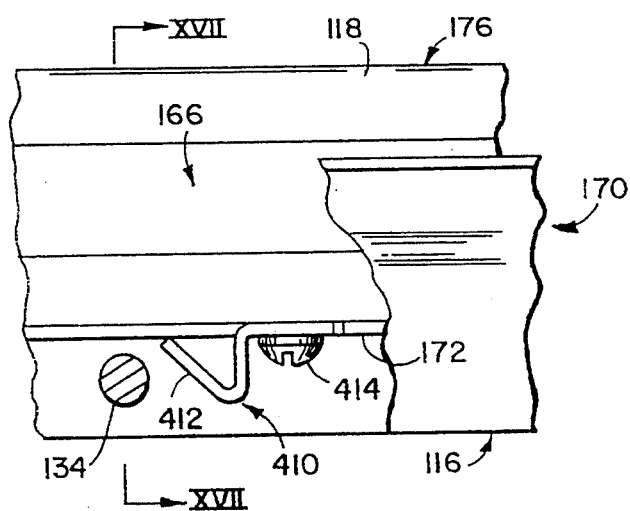
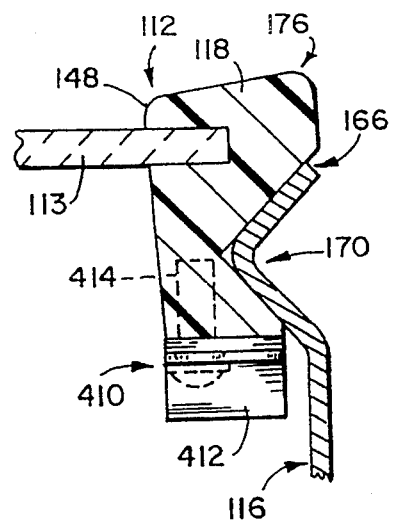
FIG. 16
FIG. 17
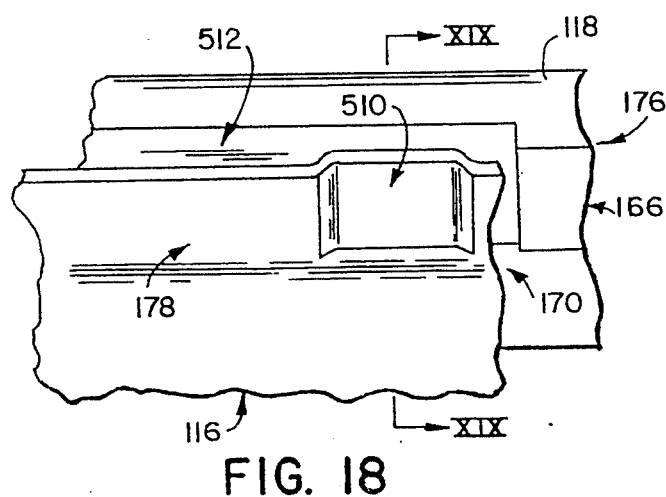
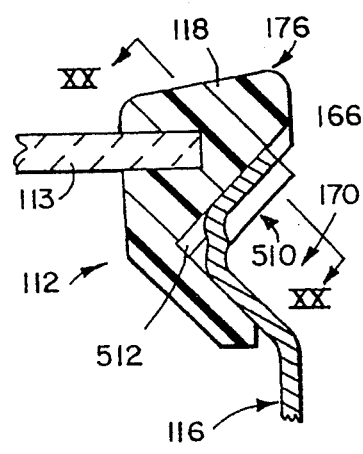
FIG. 18
FIG. 19

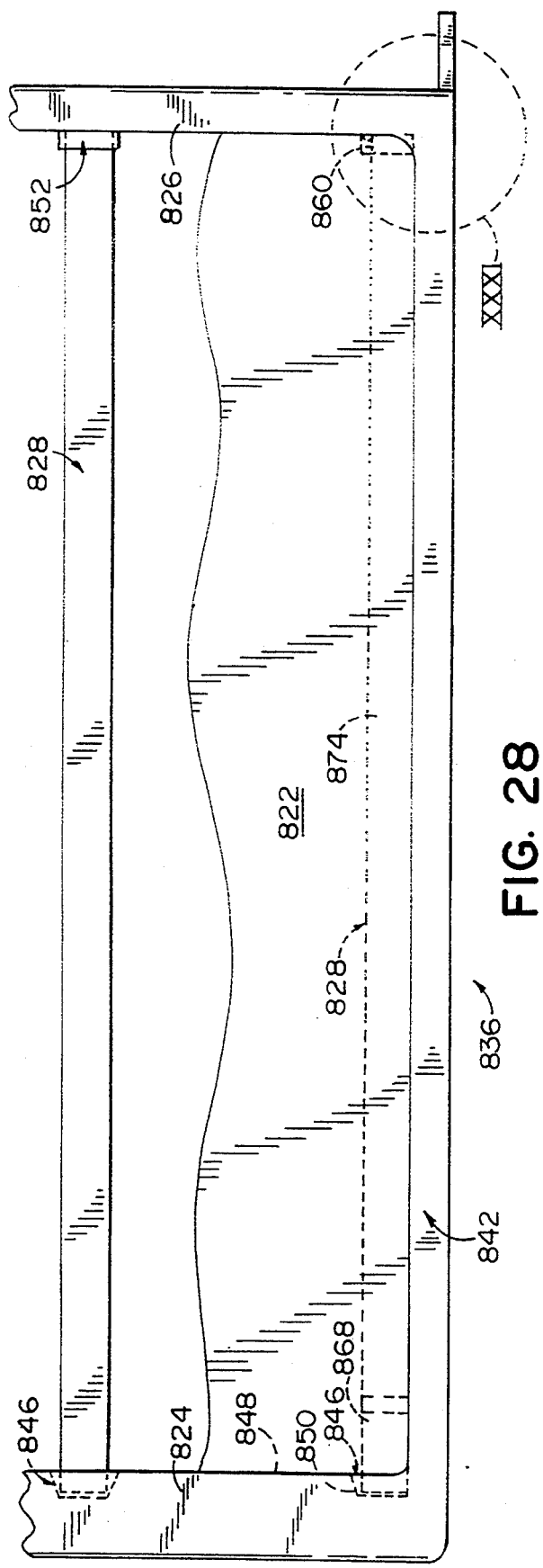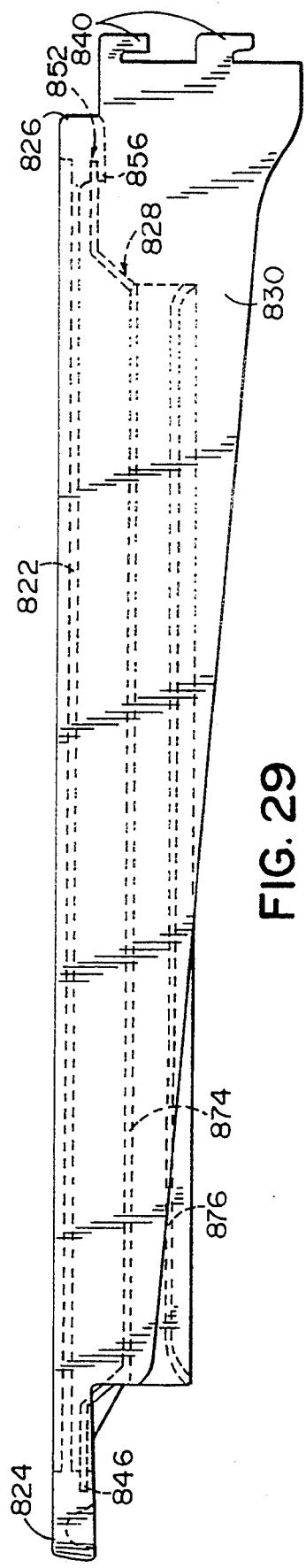

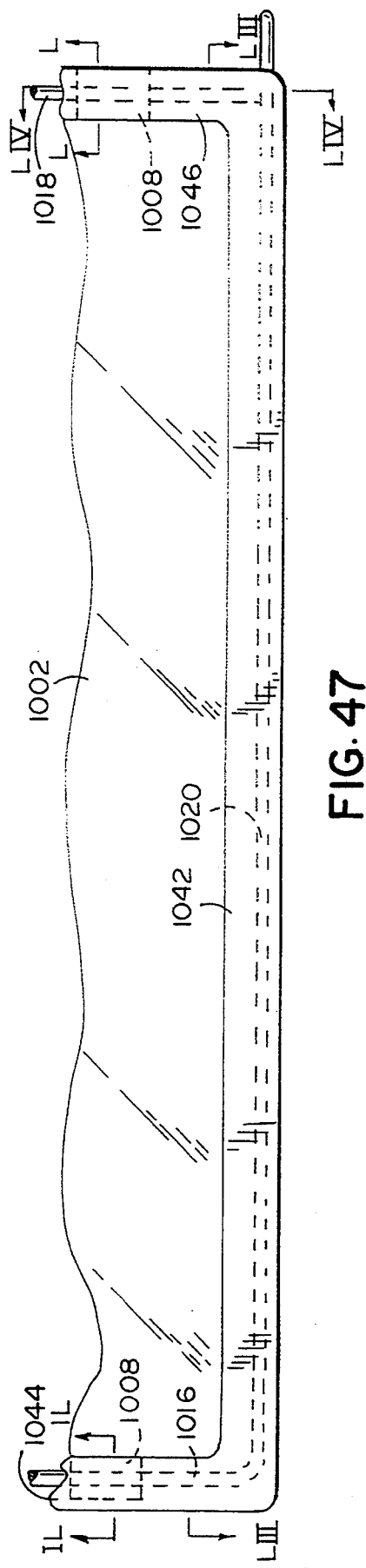
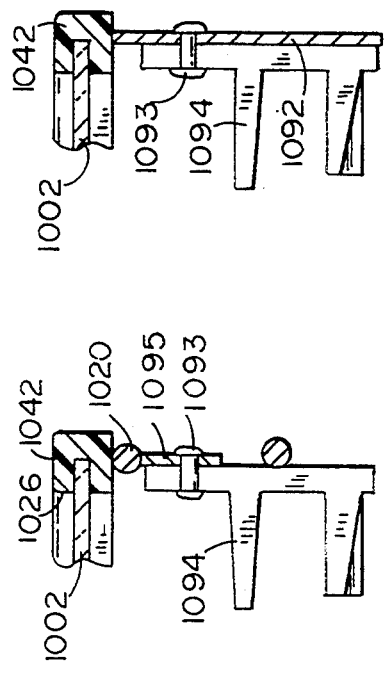
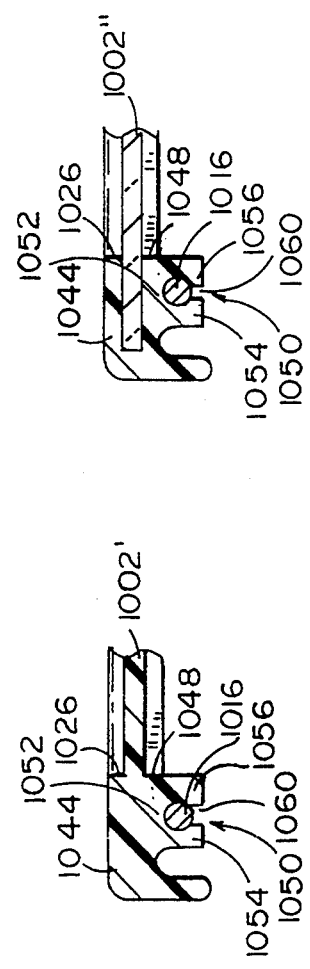
FIG. 47
FIG. 52
FIG. 51
FIG. 49
FIG. 49A

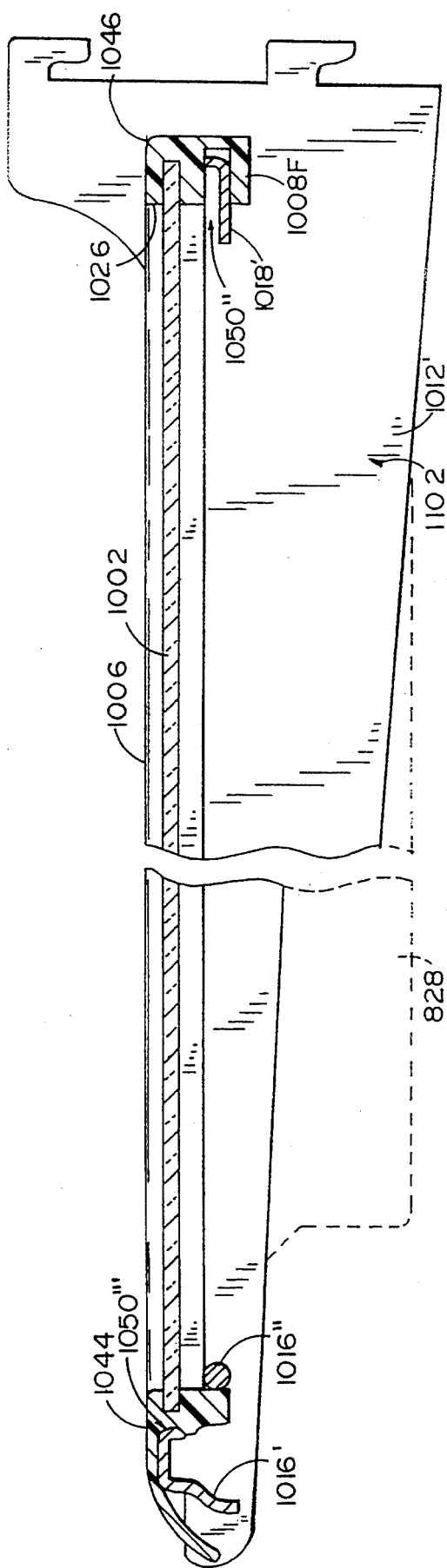
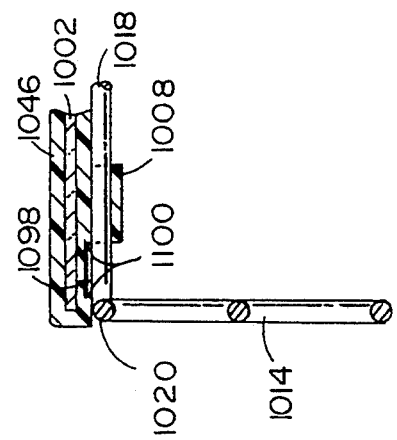
FIG. 55
FIG. 54

SNAP-ON SHELF

CROSS-REFERENCE TO RELATED APPLICATIONS

This is a continuation-in-part of application Ser. No. 07/665,661, filed Mar. 7, 1991, now U.S. Pat. No. 5,362,145 and entitled MOLDED REFRIGERATOR SHELF; of application Ser. No. 07/721,104 filed Jun. 25, 1991, now U.S. Pat. No. 5,273,354 and entitled MOLDED REFRIGERATOR SHELF AND SUPPORT BRACKET; and of application Ser. No. 07/912,778 filed Jul. 13, 1992, now abandoned, and entitled MOLDED REFRIGERATOR SHELF WITH SNAP-IN SLIDE by Kane et al., the disclosures of which are each incorporated herein by reference.

BACKGROUND OF THE INVENTION

The present invention relates to shelving for refrigerators and the like and more particularly to a simplified shelf.

As is the nature of articles containing liquids which are stored in a refrigerator or freezer, many such articles are spillable and do spill. Such a spill will typically soak into other items or contaminate other foods in the refrigerated compartment. Extensive cleanup efforts are required since the spill will commonly flow down, through the compartment, from shelf to shelf. Therefore, it is desirable to provide containment measures for limiting the area of such a spill. One such measure is a spill-resistant shelf. Such a shelf will contain a spill to the shelf and minimize if not preclude the downward flow of the spill through the compartment.

However, known spill-resistant shelves are commonly assemblies of a number of components as is disclosed in U.S. Pat. No. 4,934,541, entitled REFRIGERATOR SHELF AND METHOD OF MANUFACTURING and issued on Jun. 19, 1990, to Bussan et al. Therein, a refrigerator shelf is disclosed having a two-piece plastic "picture frame" circumscribing the periphery of a glass plate to provide a spill-resistant refrigerator shelf. For liquid spill resistance, a silicon seal should be provided between the upper frame member and the glass plate, as disclosed by Bussan et al. Thus, the effectiveness of many of the known spill-resistant shelves is dependent upon proper assembly of the shelf's components. Further, the components may require complicated and expensive manufacture.

Another problem common to these shelf structures is that spilled items can seep between the glass plate shelf member and the surrounding frame members where it is virtually impossible to remove or otherwise clean. Thus, an unsanitary condition easily develops when food stuffs become trapped between shelf members and frame members.

These structures also do not typically lend themselves to ready modification or adaptation to a variety of applications or installations. To the contrary, once the components for the shelf assembly are designed and the tooling prepared to produce these components, reconfiguration of the shelf assembly is typically an expensive proposition requiring new tooling to adapt one, another, or all of the components to meet the new configuration.

SUMMARY OF THE INVENTION

Accordingly, the present invention provides a simplified, snap-on shelf which is easily adaptable in manufacturing to provide a compact molded perimeter rim which maximizes spill retention and minimizes inaccessible entrapment of spilled items. The snap-on shelf may be easily configured during manufacturing as a sliding shelf panel or a fixed position shelf panel. Further, the present shelf may be molded in one piece to form a shelf panel, a perimeter rim, and clips for attaching to a support frame. Alternatively, the shelf may have a glass shelf panel with a perimeter rim molded about the circumference of the shelf panel with clips for attaching the shelf to a support frame molded in one piece with the perimeter rim.

Thus, the present invention provides a refrigerator shelf having a shelf panel with a perimeter edge. A perimeter rim is molded about the perimeter edge of the panel. The shelf panel is supported in a refrigerator by a frame and clips are molded in one piece with the perimeter rim to removably couple the shelf panel with the support frame.

In one aspect of the invention, the clip defines an open-sided channel in which a portion of the frame is removably received. A retainer may be included with the clip to resist removal of the frame from the channel.

In another aspect of the invention, clips may be located at a front rim region and a back rim region of the shelf and removably couple with front and back frame members which extend between left and right sides of the support frame. Alternatively, clips may be located along left and right sides of the shelf and removably couple with left and right brackets of the frame in sliding engagement so that the shelf may be a sliding shelf.

In a further aspect of the invention, a removable slide may be coupled with the shelf perimeter rim or with the support frame for receiving and supporting a separate member, such as a meat pan, storage bin, or drawer for example, in sliding engagement under the shelf panel.

These and other objects, advantages and features of the present invention will become apparent upon review of the following specification in conjunction with the drawings.

BRIEF DESCRIPTION OF THE DRAWINGS

FIG. 10 is a partially fragmentary perspective view of the shelf of FIG. 2 partially extended and showing a first embodiment of a shelf stop.

FIG. 11 is a fragmentary sectional view along section line XI—XI of the shelf stop of the shelf of FIG. 10.

FIG. 12 is a fragmentary rear elevation of the shelf stop of FIG. 11.

FIG. 14 is a fragmentary side elevation of the shelf of FIG. 2 showing a second, alternate embodiment of a shelf stop.

FIG. 15 is a fragmentary sectional view along section line XV—XV the shelf of FIG. 14.

FIG. 16 is a fragmentary side elevation of the shelf of FIG. 2 with a third, alternate embodiment of a shelf stop.

FIG. 17 is a fragmentary sectional view along section line XVII—XVII of FIG. 16.

FIG. 18 is a fragmentary side elevation of the shelf of FIG. 2 showing a fourth, alternate embodiment of a shelf stop.

FIG. 19 is a fragmentary sectional view along section line XIX—XIX of FIG. 18.

FIG. 28 is a fragmentary plan view of the shelf assembly of FIG. 27.

FIG. 29 is a side elevational view of the shelf of FIG. 27.

FIG. 47 is a fragmentary plan view of the shelf assembly of FIG. 46.

FIG. 49 is a sectional view along section line IL—IL of FIG. 47.

FIG. 49A is the view of FIG. 49 showing an alternative, one-piece shelf panel and perimeter rim.

FIG. 51 is a fragmentary sectional view along section line LI—LI of FIG. 48, showing an optional slide in phantom.

FIG. 52 is a fragmentary sectional view along section line LII—LII of FIG. 48A, showing an optional slide in phantom.

FIG. 54 is a fragmentary sectional view along section line LIV—LIV of FIG. 47.

FIG. 55 is a broken longitudinal sectional view of an alternative embodiment of the shelf of FIG. 46, showing the shelf adapted for use with a preexisting support frame.

DESCRIPTION OF THE PREFERRED EMBODIMENT

Figure 1:
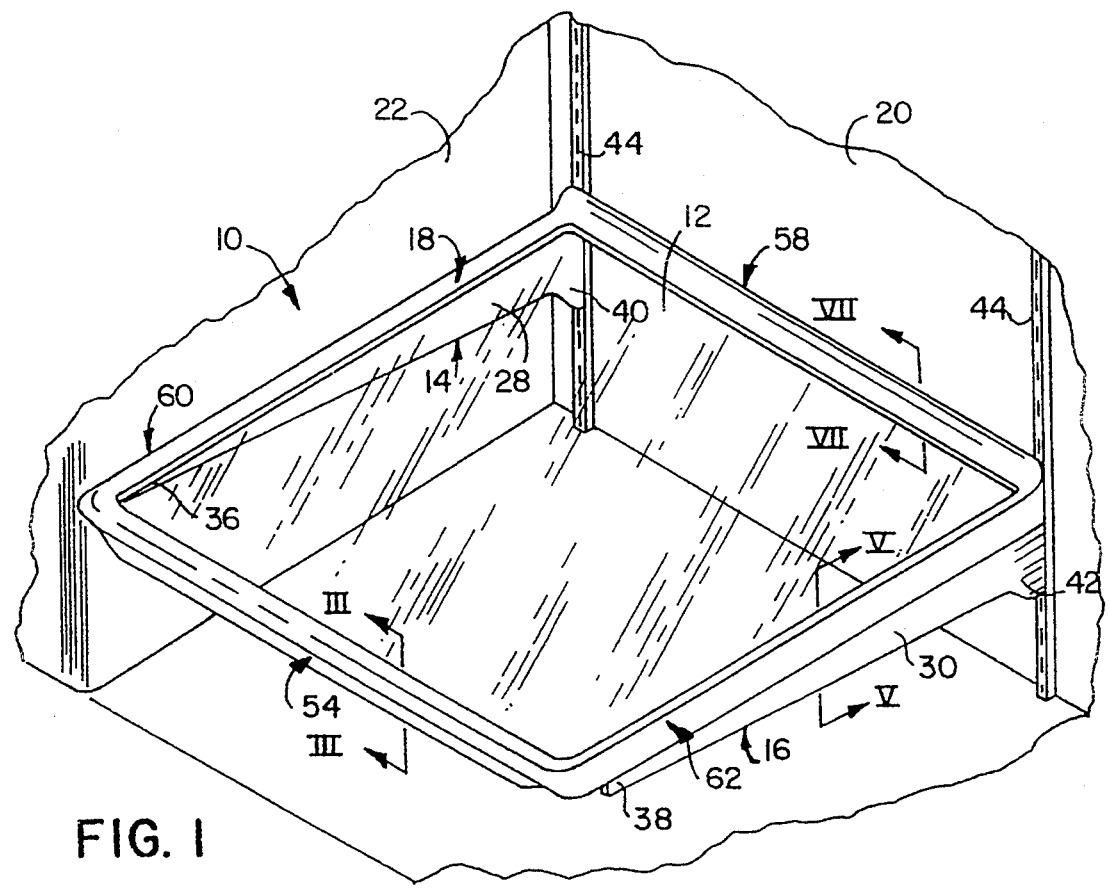
FIG. 1 is a fragmentary perspective view of the interior of a refrigerator showing a shelf according to the present invention.

Referring now to the drawings in greater detail and FIG. 1 in particular, a refrigerator shelf assembly 10 according to the present invention comprises a generally planar shelf member 12, metal support brackets 14 and 16 and a molded, resinous perimeter rim 18. Shelf assembly 10 is preferably cantilevered forward by brackets 14 and 16 from the rear wall 20 of a refrigerator.

Shelf member 12 may be a light-transmitting material, preferably optically clear tempered glass, to enhance light distribution through the refrigerated compartment. Shelf member 12 has a perimeter edge 22 (FIGS. 3 and 5) which is supported above brackets 14 and 16 and positioned to overlap above inwardly projecting flange portions 26 of the brackets. Flange portions 26 project inwardly toward each other at the top edge of generally vertical web portions 30 of each bracket 14 and 16. Thus, the brackets 14 and 16 are mirror image replicas of each other.

Figure 9:
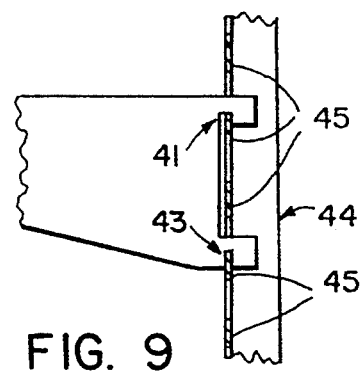
FIG. 9 is a fragmentary side elevational view showing the rear end of a support bracket.
Figure 13:
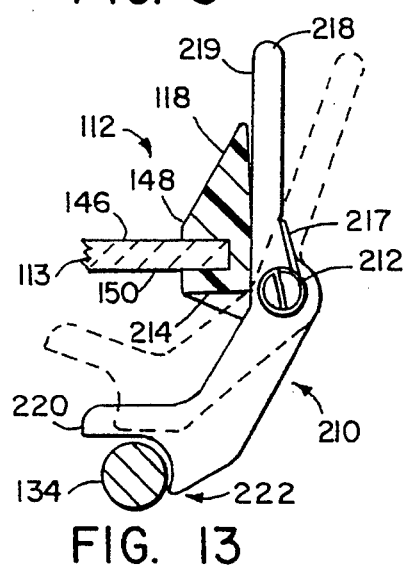
FIG. 13 is a fragmentary sectional view along section line XIII—XIII of the shelf stop of FIG. 11.

While shelf assembly 10 may be used as a fixed shelf, it is preferably used as a vertically adjustable shelf. Therefore, as shown in FIG. 9, the rear ends 40 and 42 of brackets 14 and 16 are preferably adapted for releasable engagement with shelf tracks 44 provided on rear wall 20 of the refrigerator as is commonly practiced. Recesses 41 and 43 function as hooks which engage over rungs 45 in tracks 44 to suspend the brackets. Thus, shelf assembly 10 may be positioned at a plurality of locations spaced vertically along tracks 44. Shelf assembly 10 is preferably sized to provide air circulation space between side portions 60 and 62 and the side walls 22 of the refrigerator as well as between rear edge 58 and rear wall 20 of the refrigerator to provide for proper circulation around the shelf. Further, the length of shelf assembly 10 is determined to provide air circulation space between the front edge 54 and the door (not shown) of the refrigerator.

Figure 5:
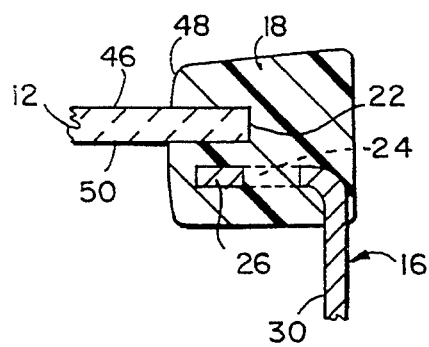
FIG. 5 is a fragmentary sectional view along section line V—V of a side edge of the shelf of FIG. 1.

Rim 18 is molded around the entire perimeter edge 22 of shelf member 12 as well as flanges 26 of brackets 14 and 16 for tight engagement and connection of shelf member 12 with brackets 14 and 16 (FIG. 5). Each of the flanges 26 is provided with a series of perforations 24 to assure secure mechanical connection between rim 18 and each support bracket 14, 16. During assembly, shelf member 12 and support brackets 14 and 16 are held and positioned within a mold while a moldable material from which rim 18 is made is injected and flows into the mold around the peripheral edge 22 of shelf member 12 and flange portions 26 and through perforations 24, encapsulating the edge 22 and flange portions 26. The moldable material of which rim 18 is comprised may include copolymer plastics such as a combination of ethylene and polypropylene or other structural, resinous plastic such as ABS or polyvinyl chloride. Further, a coloration pigment added to the moldable plastic used for molding rim 18 prior to molding to provide desired colors to the rim. For example, titanium dioxide may be added for a white coloration.

Figure 7:
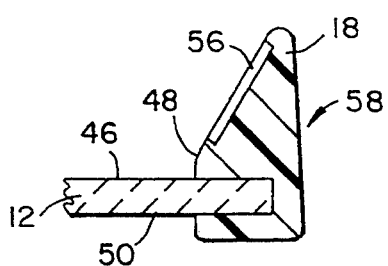
FIG. 7 is a fragmentary sectional view along section line VII—VII of the rear edge of the shelf of FIG. 1.

As the moldable material cures, i.e., cools, hardens and sets up, it becomes a tough and resilient mass extending continuously around the perimeter edge 22 of shelf member 12 for holding shelf member 12 in position above the flange portions 26 of support brackets 14 and 16. The inward extension of flanges 26 provides secure, stable support for shelf 12. Rim 18 is molded to extend above the top surface 46 of shelf member 12 and is specifically molded to define a continuous vertical wall 48 near the perimeter edge 22 of shelf member 12 forming a spill dam for containing spills occurring upon the shelf member 12 (FIGS. 3, 5 and 7).

While the seal formed between rim 18 and shelf member 12 by molding rim 18 around shelf member 12 performs quite satisfactorily, depending on the specific resinous plastic chosen, one may wish to enhance the seal by coating perimeter edge 22 and the adjoining top 46 and bottom 50 surfaces of shelf member 12, adjacent perimeter edge 22, prior to the molding of rim 18 therearound with a primer layer or coating of a heat activatable, resinous material which promotes and facilitates the adhesion of the rim material to the glass shelf member 12.

Figure 3:
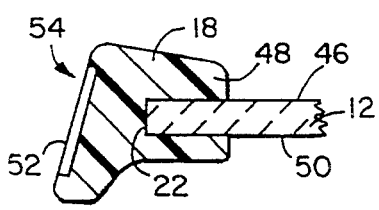
FIG. 3 is a fragmentary sectional view along section line III—III of the front edge of the shelf of FIG. 1.

As shown in FIG. 3, a decorative trim piece 52 may be molded into rim 18 along the front edge 54 of shelf member 12. Likewise, a decorative trim piece 56 may be molded into rim 18 along the rear edge 58 of shelf member 12 (FIG. 7).

Figure 2:
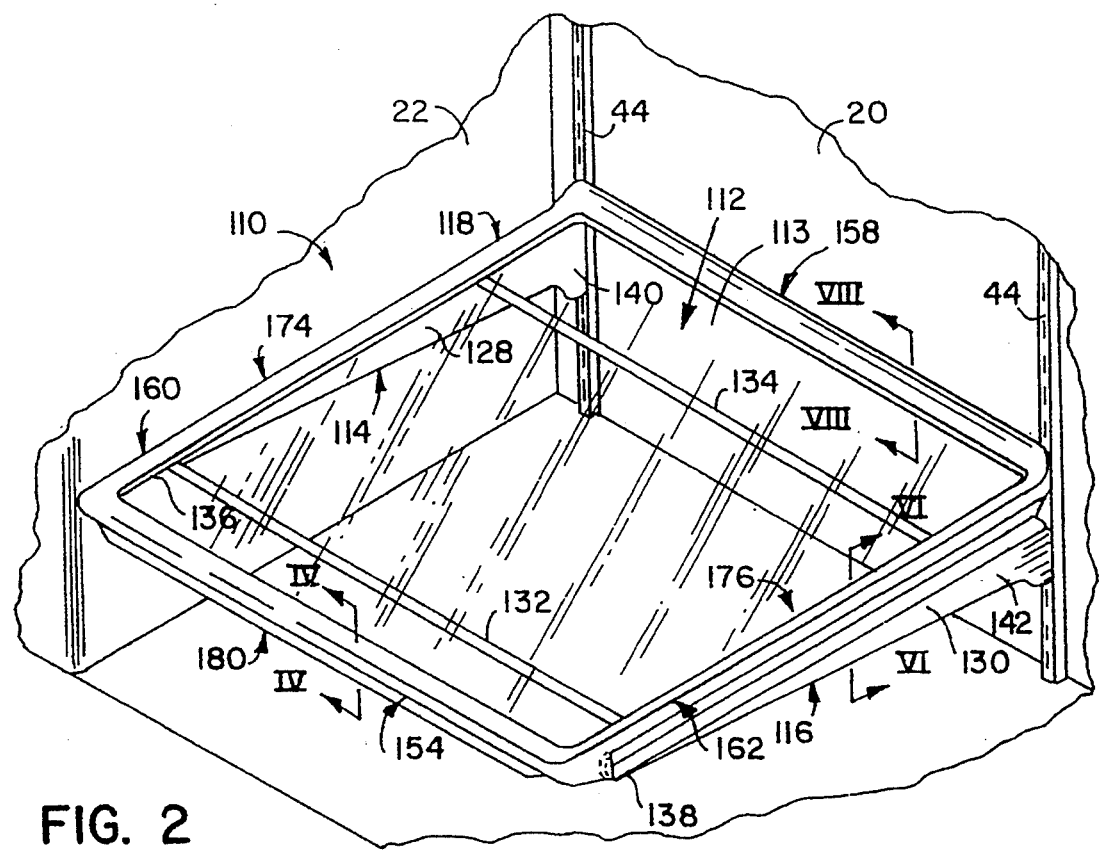
FIG. 2 is a fragmentary perspective view of the interior of a refrigerator showing a sliding shelf according to the present invention.

Alternatively, a slidable shelf assembly 110, according to the present invention, is shown in FIG. 2 comprising a slidable shelf member 112, metal support brackets 114 and 116, and a molded, resinous perimeter rim 118. Shelf assembly 110 is also preferably cantilevered forward by brackets 114 and 116 from the rear wall 20 of a refrigerator.

Figure 6:
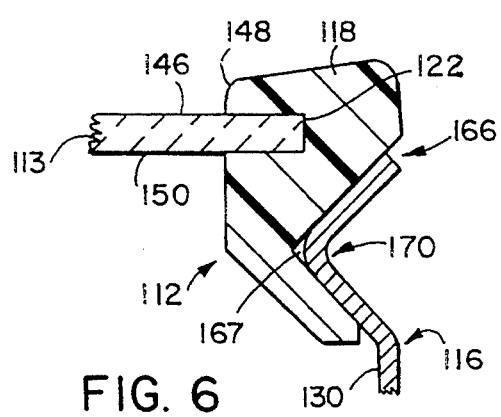
FIG. 6 is a fragmentary sectional view along section line VI—VI of a side edge of the shelf of FIG. 2.

Shelf member 112 comprises a generally planar shelf panel 113 and rim 118. Shelf panel 113 may be a light-transmitting material, preferably optically clear tempered glass, to enhance light distribution through the refrigerated compartment. Shelf panel 113 has a perimeter edge 122 which is encapsulated by perimeter rim 118 (FIG. 6).

Figure 8:
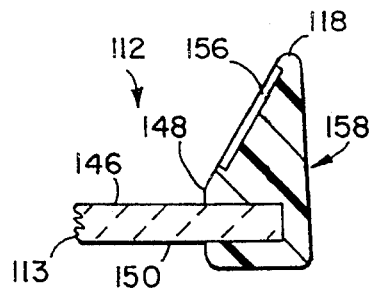
FIG. 8 is a fragmentary sectional view along section line VIII—VIII of the rear edge of the shelf of FIG. 2.

Rim 118 is molded around the perimeter edge 122 of shelf panel 113. During assembly, shelf panel 113 is held in position within a mold while a moldable material is injected and flows into the mold around perimeter edge 122. Again, the moldable material may be a copolymer plastic or other structural plastic. Also, a coloration pigment, as discussed above, may be added to the plastic used for molding rim 118. Rim 118 is also molded to extend above the top surface 146 of shelf panel 113 and is specifically molded to define a continuous vertical wall 148 near the perimeter edge 122 of shelf panel 113 forming a spill dam for containing spills occurring upon the shelf member 112 (FIGS. 4, 6 and 8).

The seal between rim 118 and shelf panel 113 may be enhanced by coating perimeter edge 122 and the top 146 and bottom 150 surfaces of shelf panel 113 near perimeter edge 122 with a primer layer of a heat activatable, resinous material as described above.

Figure 4:
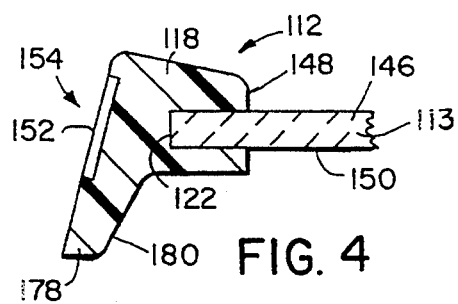
FIG. 4 is a fragmentary sectional view along section line IV—IV of the front edge of the shelf of FIG. 2.

A shelf pull 180 is molded along the front edge 154 of shelf member 112 by extending the lower edge 178 of rim 118 downwardly (FIG. 4). Further, as shown in FIG. 4, a decorative trim piece 152 may be molded into rim 118 along the front edge 154 of shelf member 112. A decorative trim piece 156 may also be molded into rim 118 along the rear edge 158 of shelf member 112 (FIG. 8).

As is best seen in FIGS. 2 and 6, a generally V-shaped channel is preferably molded into the outwardly facing side surface of each side portion 160 and 162 of rim 118 to define slide guides 166. A corresponding, generally V-shaped ridge 167 is formed along the top edges 126 of each support bracket 114 and 116 defining slide rails 170 for sliding engagement with the slide guides.

The support brackets 114 and 116 of shelf assembly 110 are mirror image replicas of each other, having rear ends 140 and 142 identical to bracket ends 40 and 42 of brackets 14 and 16, and preferably adapted for releasable engagement with shelf tracks 44. Tracks 44 are provided on rear wall 20 of the refrigerator as is commonly practiced for vertically adjustable shelf positioning of the shelf assembly 110 along tracks 44. A pair of cross braces 132 and 134 connecting between webs 128 and 130 of support brackets 114 and 116 are provided for holding the support brackets in spaced relation to each other. Brace 132 is connected to each web 128 and 130 near the forward ends 136 and 138 of brackets 114 and 116. Brace 134 is connected to each web 128 and 130 at a position approximately one-third to one-half of the length of brackets 114 and 116 forward of ends 140 and 142. Cross braces 132 and 134 are required in sliding shelf assembly 110 to stabilize the support brackets 114 and 116 and to maintain the proper positioning of front ends 136 and 138 of the brackets, precluding the front ends from spreading apart as a load is applied to the shelf assembly 110. Shelf assembly 110 also includes one of several embodiments 210, 310, 410, 510, 610 or 710 of a shelf stop to preclude the inadvertent overextension of the slidable shelf.

A first alternative embodiment of a shelf stop is shown in FIGS. 10–13 comprising a lever 210 mounted on a pivot rod 212 and a pair of pivot rod mounts 214 and 216 projecting downward from the rear edge 158 of shelf member 112, near bottom surface 150. Lever 210 has a top end 218 which projects above the perimeter rim 118 for manipulation by a user. Lever 210 also has a lower end 220 defining a catch 222 for engagement with cross braces 132 and 134. As the shelf member 112 is slid forward, the catch 222 approaches and engages the brace 134 precluding further extension of the shelf. The relative position of brace 134 controls the extension of shelf member 112 and is preferably approximately one-third to one-half the length of brackets 114 and 116 forward of ends 140 and 142. The shelf stop may be released by sliding the shelf rearward sufficiently to move catch 222 away from brace 134 and moving the lever 210 to a release position as shown in phantom in FIG. 13. Lever 210 is easily pivoted to the release position by pressing rearward on face 219 of lever 210 near its top end 218. With the lever in the release position, the catch 222 can slide above and past the brace 134. If the lever 210 is released to pass brace 134 and allowed to return to its latch position, the catch 222 will engage the other brace 132 as the shelf member 112 is extended. By keeping the lever 210 in the release position, shelf member 112 can be fully removed. A return spring 217 may be mounted with lever 210 to bias the lever to the latch position. Alternatively, lever 210 may be designed so that the force of gravity is sufficient to bias the lever to the latch position.

A second, alternative shelf stop embodiment is shown in FIGS. 14 and 15 comprising a slot 310 cut into at least one slide rail 168 and 170 and a cooperating stop pin 312 mounted in a fixed position and projecting from perimeter rim 118 at the corresponding slide guide 164 and 166 into the slot 310. The slot 310 has a front end wall 314 and a rear end wall (not shown) to limit the movement of pin 312 for limiting the extension and retraction of shelf assembly 110. The length and position of the slot 310 in combination with the position of the stop pin 312 will dictate the length of extension for shelf member 112, which is preferably in the range of one-third to one-half the length of the shelf support brackets 114 and 116. Use of this shelf stop embodiment generally precludes the removal of the shelf member 112 from the support brackets 114 and 116, but does not inhibit the removal of the entire shelf assembly 110 from the refrigerator compartment. Brackets 114 and 116 must be assembled to shelf member 112 with stop pins 312 received in slots 310 before mounting the entire assembly on tracks 44.

A third, alternative embodiment of a shelf stop is shown in FIGS. 16 and 17 comprising a formed metal clip 410 mounted to the bottom surface 172 of the perimeter rim 118 along at least one side portion 174 and 176 of the rim 118. The clip 410 is configured with an inclined front abutting surface 412 for engagement with a cross brace 132 or 134 to limit the extension of the shelf member 112. The relative position of clip 410 will determine the extension of shelf member 112. Clip 410 is preferably bent from a strap of steel or formed from other resilient material so that the clip 410 will deform when forced past the cross brace and will resume its original configuration once past the cross brace. Clip 410 is preferably removably mounted to the perimeter rim 118 by a screw 414 so that it can be removed rather than requiring that it be forced past the cross brace during assembly and disassembly of the shelf assembly 110. Alternately, the shelf assembly can be removed from tracks 44 and disassembled.

Figure 20:
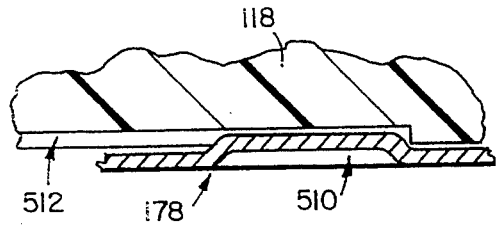
FIG. 20 is a fragmentary sectional view along section line XX—XX of FIG. 19.

A fourth, alternative embodiment of a shelf stop is shown in FIGS. 18–20 comprising a detent 510 pressed out of the side 178 of at least one of the slide rails 168 and 170 and a corresponding groove or channel 512 cut or molded into the side of the corresponding slide guide 164 and 166. The relative position of detent 510 and the relative position and length of channel 512 will control the extension of shelf member 112. Again, the brackets with slide rails 168 and 170 are assembled to shelf 112 such that detent 510 is received in channel 512 prior to mounting the entire assembly in tracks 44.

Figure 21:
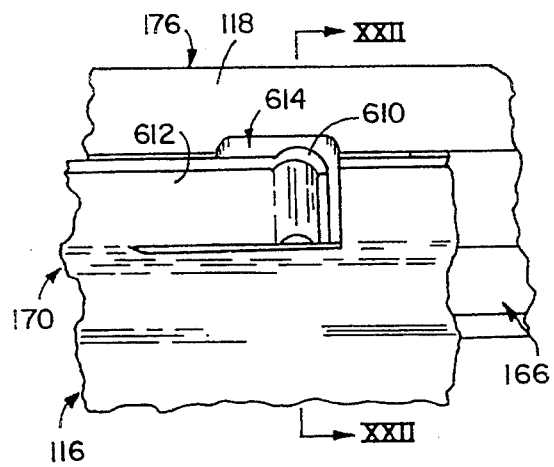
FIG. 21 is a fragmentary side elevation of the shelf of FIG. 2 showing a fifth, alternate embodiment of a shelf stop.
Figure 22:
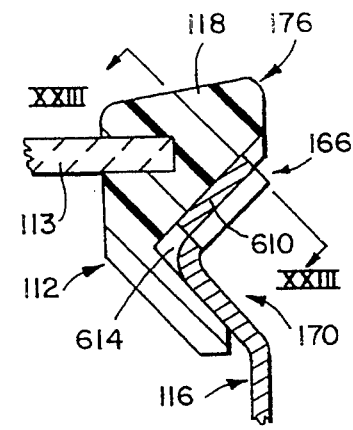
FIG. 22 is a fragmentary sectional view along section line XXII—XXII of FIG. 21.
Figure 23:
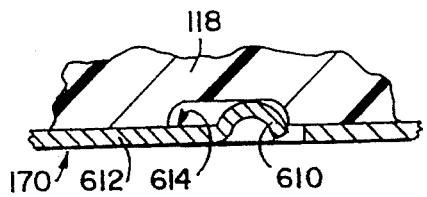
FIG. 23 is a fragmentary sectional view along section line XXIII—XXIII of FIG. 22.

A fifth, alternative shelf stop is shown in FIGS. 21–23 comprising a detent 610 projecting from the end of a flexible finger 612 formed in at least one of the slide rails 168 and 170 and a notch 614 cut or molded into the side of the corresponding slide guide 164 and 166. Again, the relative positioning of the detent and notch will determine the extension of shelf member 112. Also, shelf member 112 can be removed from the support brackets 114 and 116 by forcing the notch 614 past the resilient detent 610.

Figure 26:
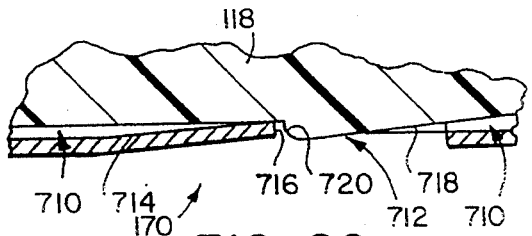
FIG. 26 is a fragmentary sectional view along section line XVI—XXVI of FIG. 25.
Figure 25:
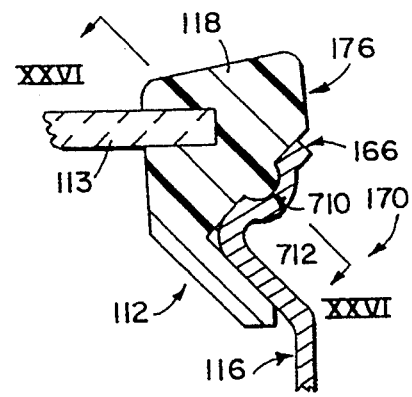
FIG. 25 is a fragmentary sectional view along section line XXV—XXV of FIG. 24.
Figure 24:
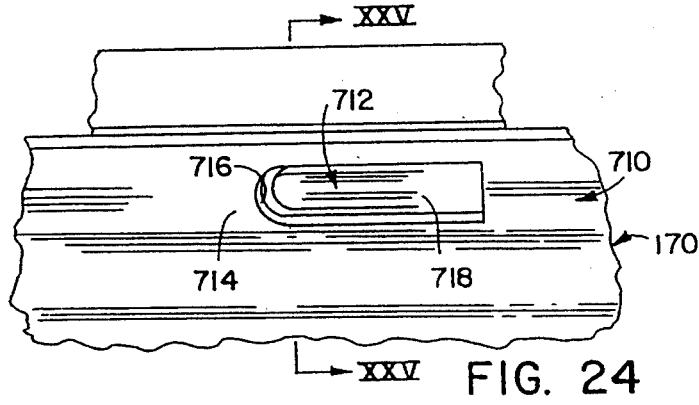
FIG. 24 is a fragmentary side elevation of the shelf of FIG. 2 showing a sixth, alternate embodiment of a shelf stop.

A sixth, alternative shelf stop embodiment is shown in FIGS. 24–26 comprising a groove 710 formed in at least one of slide rails 168 and 170 and a cooperating protrusion 712 formed on the corresponding slide guide 164 and 166. An inclined camming surface 714 with an end wall 716 projecting into the groove 710 is formed over a portion of the length of the groove 710. The protrusion 712 is molded with a cooperating inclined camming surface 718 and upstanding end wall 720 so that the shelf member 112 can be assembled by sliding the shelf member 112 into the front ends 140 and 142 of support brackets 114 and 116 and forcing protrusion 712 past the stop wall 716 in the groove. The perimeter rim 118 material of which the protrusion 712 is formed is sufficiently flexible and resilient so that protrusion 712 will deform as its camming surface 718 engages and slides over the camming surface 714 of the rail groove 710 and will resume its undeformed configuration once end wall 720 is past the stop end wall 716. Removal of shelf member 112 must be accomplished by removal of the entire assembly from tracks 44 followed by removing brackets 114 and 116 from the slide rails 168 and 170.

Figure 27:
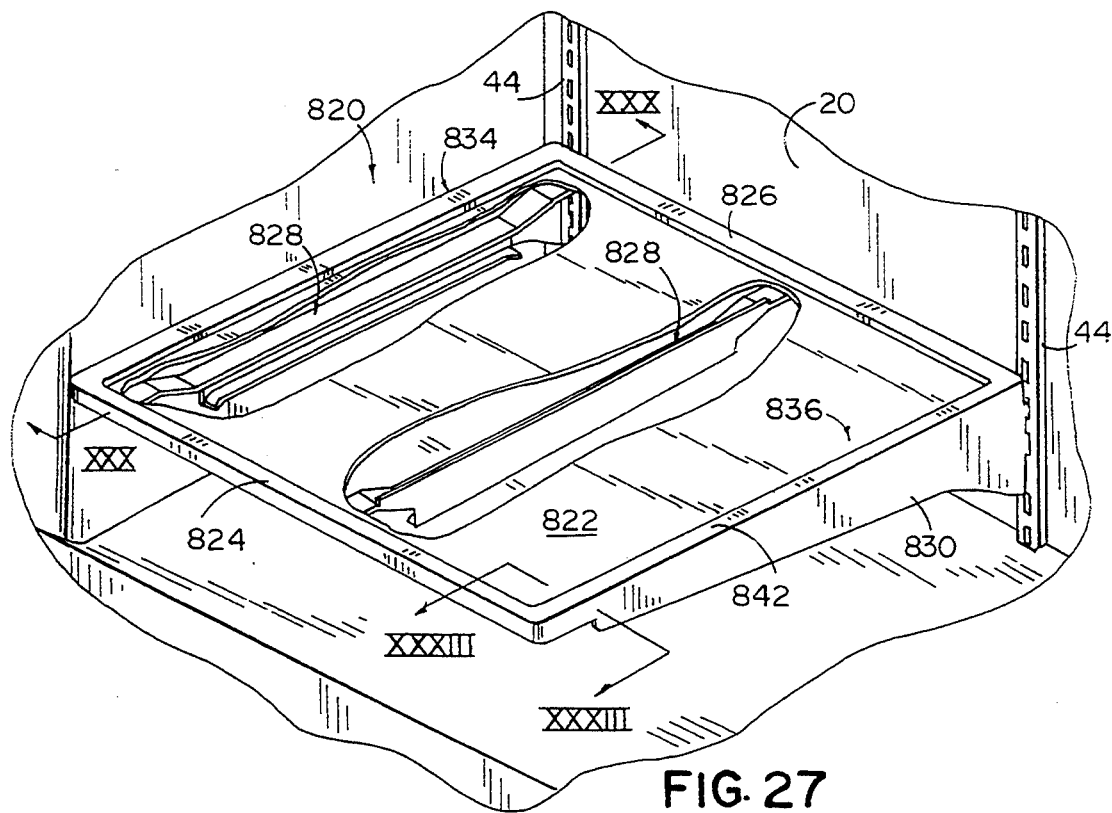
FIG. 27 is a perspective view of a third alternative embodiment of a shelf assembly according to the present invention, shown in a refrigerator.

Now generally referring to drawing FIGS. 27–34, a third alternative embodiment of a shelf assembly 820 according to the present invention includes a shelf panel 822 having a front rim portion 824, and a back rim portion 826, and preferably a pair of slides 828 (FIG. 27).

Figure 30:
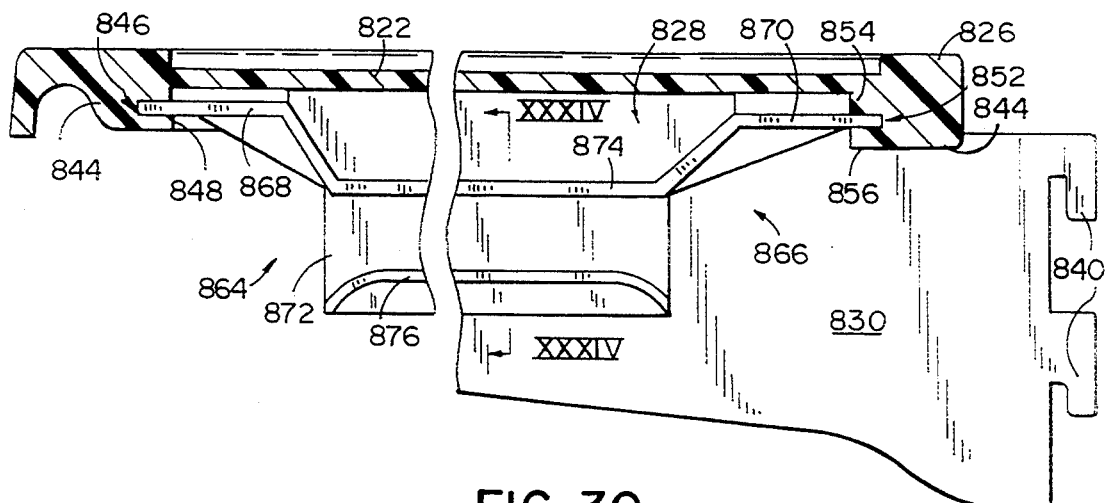
FIG. 30 is a broken sectional view along section line XXX—XXX of FIG. 27.

In the embodiment shown in FIG. 27, shelf assembly 820 further includes a pair of support brackets 830 which may cantilever forward from a rear wall 20 of a refrigerator. Brackets 830 are preferably elongated members which extend along at least a portion of opposing sides 834 and 836 of shelf assembly 820. Most preferably, brackets 830 releasably engage shelf tracks 44 provided on rear wall 20 for vertical adjustment of shelf assembly 820. Brackets 830 therefore have hooks 840 formed at a back end of brackets 830 for engaging rungs in tracks 44 (FIGS. 29 and 30).

Figure 32:
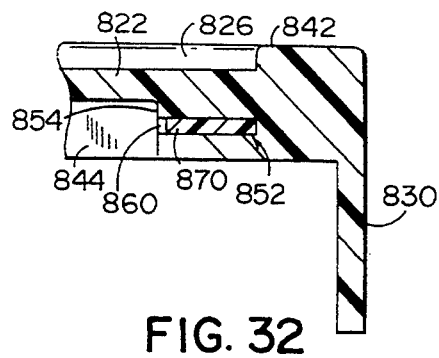
FIG. 32 is a fragmentary sectional view along section line XXXII—XXXII of FIG. 31.
Figure 31:
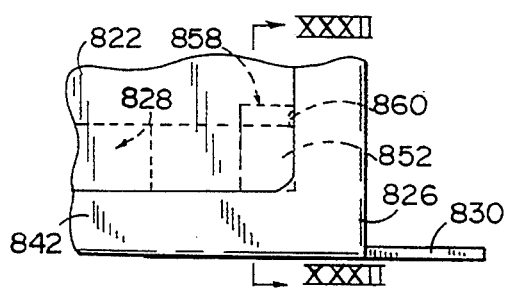
FIG. 31 is an enlarged view of detail XXXI of FIG. 28.

Shelf panel 822 is supported by brackets 830 and may be contoured to facilitate a variety of specific purposes, but generally provides a planar surface to support items placed thereon for storage in a refrigerator. Most preferably, shelf panel 822 is circumscribed by a perimeter rim 842 which incorporates front portion 824 and back portion 826 (FIGS. 27, 31, and 32). Brackets 830 may be separate plastic or metal components or molded in one piece with perimeter rim 842.

Shelf panel 822 may be formed from a light-transmitting material, preferably optically clear, tempered glass, to enhance light distribution through the refrigerator compartment, as discussed in greater detail above and disclosed in the above-referenced and incorporated patent applications Ser. No. 07/665,661 and 07/721,104. In the present embodiment as shown in FIG. 27, however, shelf panel 822, brackets 830, and perimeter rim 842 are most preferably one piece, molded in a convenient one-step process. During this process, a moldable material is injected and flows into a continuous cavity mold, defining entire shelf assembly 820. The moldable material may be any of a variety of suitable plastic materials, including copolymer plastics such as a combination of ethylene and polypropylene or other structural, resinous plastics such as ABS or polyvinyl chloride for example. Further, a coloration pigment to provide desired colors may be added to the moldable plastic material. A whitening coloration such as titanium dioxide may be used for example.

As the moldable material cures, that is cools, hardens, or sets up, it becomes a tough and resilient mass, forming shelf panel 822, perimeter rim 842, and support brackets 830 in one piece. Perimeter rim 842 may be molded to project above the surface of shelf panel 822 and form a spill dam as shown in the embodiment of FIGS. 27-34, or may be made flush with the top surface of the shelf panel, similar to the embodiment shown in FIG. 35. In either embodiment, perimeter rim 842 includes at least a lower portion 844 which extends below shelf panel 822 (FIGS. 30-32).

A front slide receptacle 846 is preferably defined in lower portion 844 of front rim portion 824 during the molding process and may be provided at any desired location along front rim portion 824 and at a desired number of locations, including, but not limited to, adjacent each side 834 and 836 of shelf assembly 820 for example (FIGS. 28 and 32). Each front slide receptacle 846 comprises a recess defined in a rear surface 848 of the lower portion 844 of front rim portion 824 and extending generally parallel to shelf 822. Each front slide receptacle 846 is a generally rectangular recess having a height and a width which is greater than its height. Further, each front slide receptacle 846 has an angled side wall 850 (FIGS. 28 and 32). Wall 850 is angled to accommodate the addition and removal of slide 828 which is discussed further below.

Figure 33:
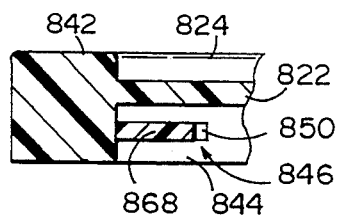
FIG. 33 is a fragmentary sectional view along section line XXXIII—XXXIII of FIG. 27.

Similarly, a back slide receptacle 852, corresponding to each front slide receptacle 846, may likewise be defined in lower portion 844 of back rim portion 826 (FIGS. 29-31). Alternatively, each back slide receptacle 852 is preferably defined between a forward projecting portion 854 of back rim portion 826 which extends below shelf panel 822, and a cooperating tab 856 which projects forward from back rim portion 826 and is spaced below portion 854. Each back slide receptacle 852 is a generally rectangular slot extending generally parallel to shelf 822 and having a height and a width greater than its height. Further, each back slide receptacle 852 has an open side 858 located away from the adjoining shelf assembly side 834, 836. Back slide receptacle 852 also includes a retainer 860 formed by a protrusion or half-cylinder projection at open side 858 (FIG. 33).

A plurality of cooperating front and back slide receptacles 846, 852 may also be provided along each of front rim portion and back rim portion 824, 826, respectively, so that slides 828 may be positioned along the length of front and back rim portions 824 and 826. Thus, a slide member supported by slides 828 may selectively be positioned along the width of the shelf assembly 820, and slide members of various widths may be accommodated.

Slide 828 is an elongated member with opposing front and back ends 864 and 866, respectively (FIG. 30). A tab 868 extends from front end 864 and forms a front attachment member having a generally rectangular cross-sectional shape corresponding to front slide receptacle 846. Likewise, a back tab 870 extends from back end 866, forming a back attachment member having a generally rectangular cross-sectional shape corresponding to back slide receptacle 852.

Figure 34:
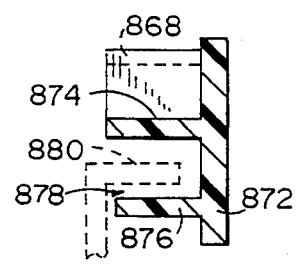
FIG. 34 is a cross-sectional view of the slide of the shelf assembly taken along section line XXXIV—XXXIV of FIG. 30.
Figure 36:
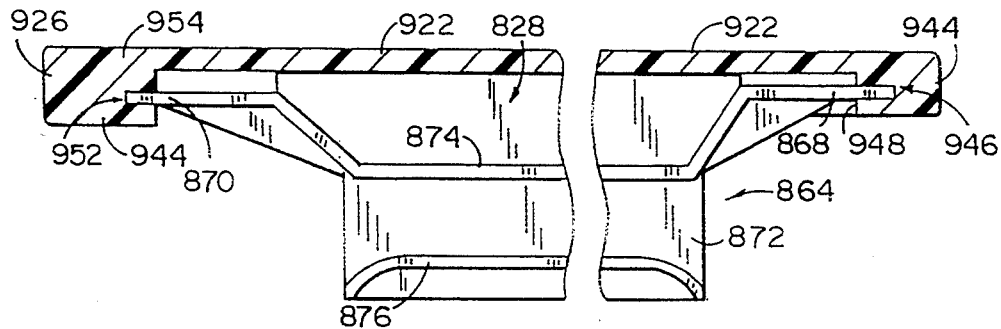
FIG. 36 is a broken sectional view along section line XXXVI—XXXVI of FIG. 35.

A body portion of slide 828 is defined by a generally vertically oriented plate portion 872 and a pair of vertically spaced rails 874 and 876 projecting generally perpendicular to vertical plate 872 and toward the same general direction from one side of vertical plate 872 (FIG. 34). Vertical plate 872 and the rails 874, 876 define an open-sided, open-ended slide track 878 for receiving and supporting a cooperating slide member 880 of a storage bin, drawer, pan, or other separate member for use in the refrigerator. Rail 876 includes downwardly curved ends so that the supported slide member, bin, or drawer can more easily be slid into place. The upper rail 874 merges with front and back tabs 868 and 870 at each of the ends 864, 866 of slide 828, respectively. Thus, slide 828 is symmetrical end to end and eliminates the need for left- and right-hand counter parts.

In use, a slide 828 is easily installed by positioning the front and back tabs 868, 870 of slide 828 parallel to, adjacent, and under shelf panel 822, inserting front tab 868 into a front slide receptacle 846, and swinging back tab 870 through open side 858, past retainer 860, and into a corresponding back slide receptacle 852. As back tab 870 is swung past retainer 860, slide 828 snaps into place generally parallel with bracket 830. Slide 828 is simply removed by reversing the installation steps. Since slide 828 is preferably symmetrical end to end so that left-hand and right-hand side slides are not necessary, an identical unit may be installed in either a left-hand or right-hand position.

Figure 35:
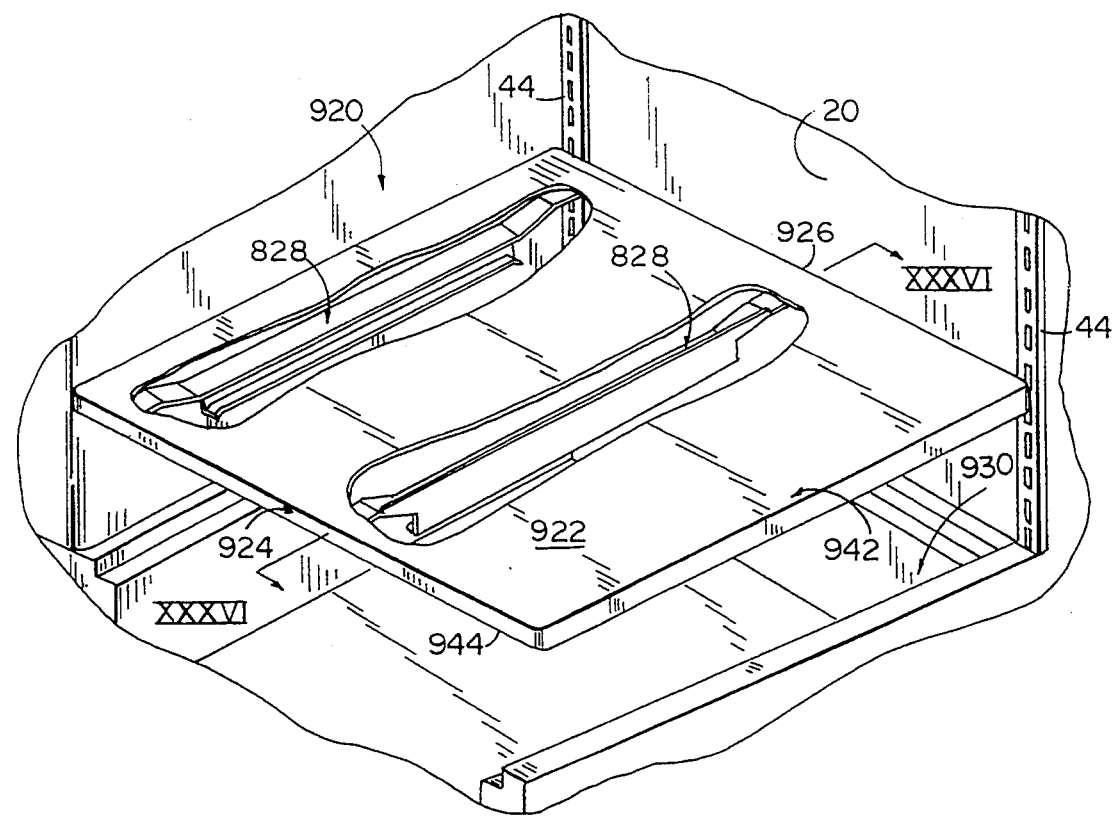
FIG. 35 is a perspective view of a fourth alternative embodiment of a shelf assembly according to the present invention.

A fourth alternative embodiment, shelf assembly 920, according to the present invention is shown in FIG. 35 and includes a shelf panel 922, a front rim portion 924, a back rim portion 926 and a pair of slides 828. Shelf assembly 920 is preferably used as a bottom refrigerator shelf and may be positioned in a cooperating recess 930 provided at the bottom of a refrigerator as shown in FIG. 35, or may be supported by other methods commonly known in the refrigerator shelf field.

Shelf assembly 920 is most preferably molded in one piece from a moldable material as discussed above. In shelf assembly 920, a perimeter rim 942, including front portion 924 and back portion 926, may be molded to project above a top surface of shelf panel 922 to form a spill dam. Alternately and preferably, the rim is molded flush with the top surface of shelf panel 922 as shown in FIG. 35. In either rim embodiment, perimeter rim 942 includes at least a lower portion 944 which extends below shelf panel 922. As shown in FIGS. 30-33 and discussed above regarding shelf assembly 820, shelf assembly 920 also includes front slide receptacles 846 and back slide receptacles 852 defined in front rim portion 924 and back rim portion 926, respectively, for releasably coupling with slide 828.

Figure 37:
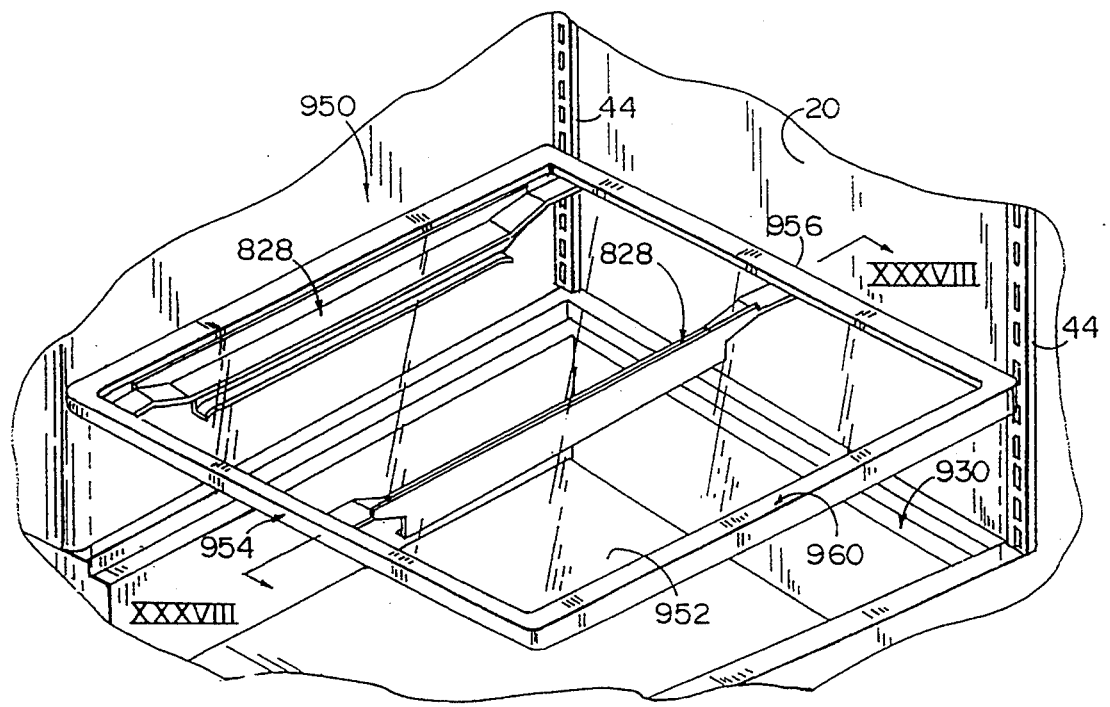
FIG. 37 is a perspective view of a fifth alternative embodiment of a shelf assembly according to the present invention.

A fifth alternative embodiment of a shelf assembly 950 is shown in FIG. 37. Shelf assembly 950 includes a shelf panel 952, a front rim 954, and a back rim 956. Shelf assembly 950 may be used as a bottom refrigerator shelf and supported by a variety of methods in a bottom shelf position, including a cooperating recess 930 provided at the bottom of a refrigerator as shown in FIG. 37 for example.

Figure 38:
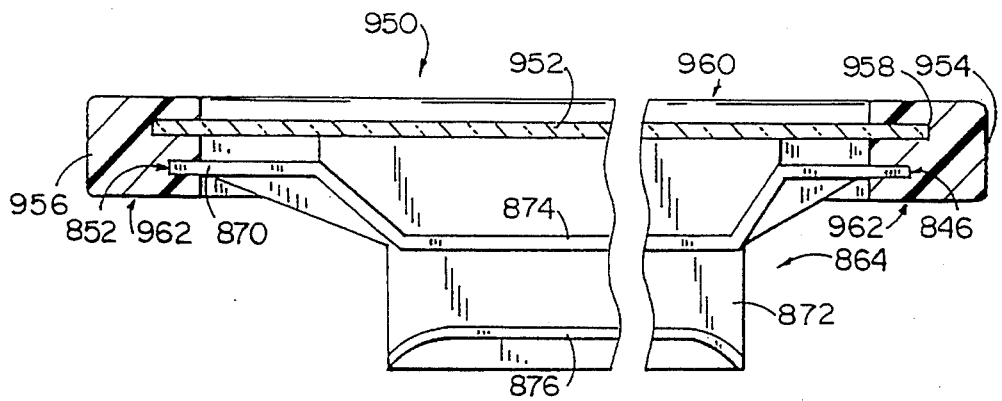
FIG. 38 is a broken sectional view along section line XXXVIII—XXXVIII of FIG. 37.

Shelf panel 952 is preferably optically clear tempered glass or other light-transmitting material to enhance light distribution through the refrigerator compartment. Shelf panel 952 has a perimeter edge 958 which is preferably encapsulated by a perimeter rim 960 (FIG. 38). Rim 960 incorporates front rim 954 and back rim 956 and is molded around perimeter edge 958 of shelf panel 952. Shelf panel 952 is held in position within a mold during assembly while a moldable material is injected and flows into the mold around perimeter edge 958 as discussed in greater detail above. Rim 960 is molded to extend above shelf panel 952, specifically to form a spill dam for containing spills which may occur upon shelf member 950 (FIGS. 37 and 38).

Rim 960 includes a lower portion 962 which extends below shelf panel 952. Shelf assembly 950 also includes front slide receptacles 846 and back slide receptacles 852 defined in front rim 954 and back rim 956, respectively, for releasably coupling with slide 828 as discussed in greater detail above regarding shelf assembly 820.

Figure 39:
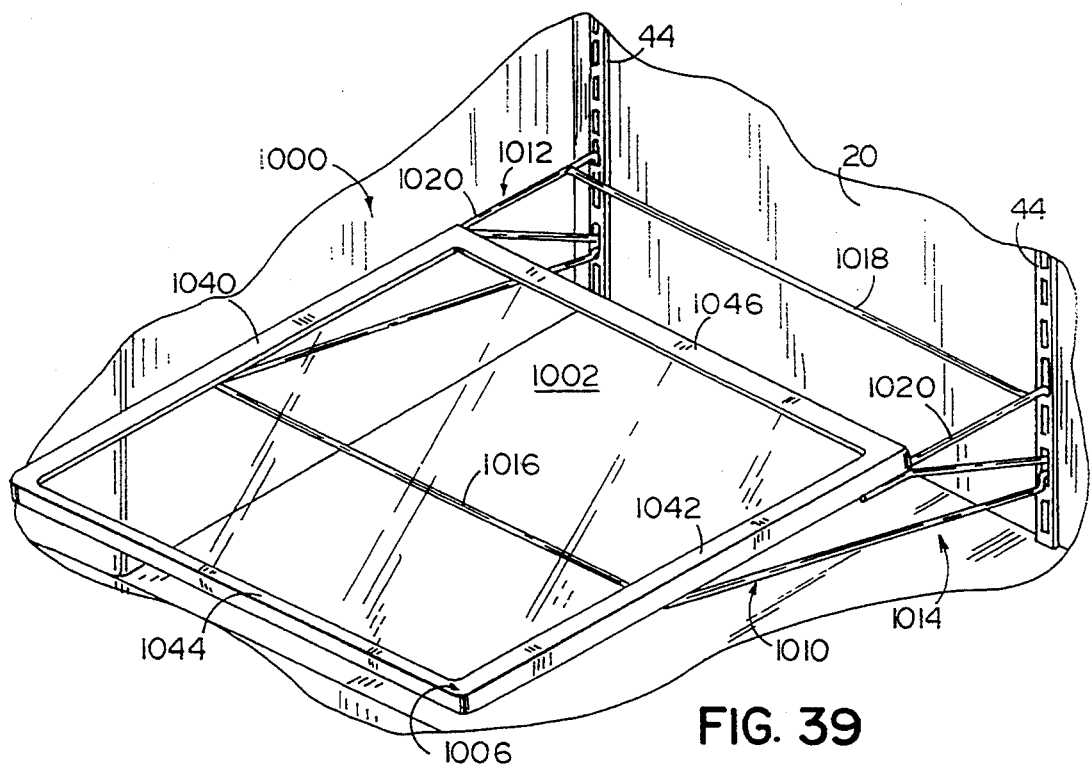
FIG. 39 is a perspective view of a sixth alternative embodiment of a shelf assembly according to the present invention.

Referring generally to drawing FIGS. 39-45, a sixth alternative embodiment of a sliding shelf assembly 1000 (FIG. 39) according to the present invention includes a shelf panel 1002 having a perimeter edge 1004 (FIGS. 42-45) and a perimeter rim 1006 molded about the perimeter edge. Attachment clips 1008 are molded in one piece with perimeter rim 1006 and removably couple in sliding engagement with a support frame 1010 for sliding between a retracted position (FIGS. 40 and 41) and an extended position (FIG. 39).

Figure 41:
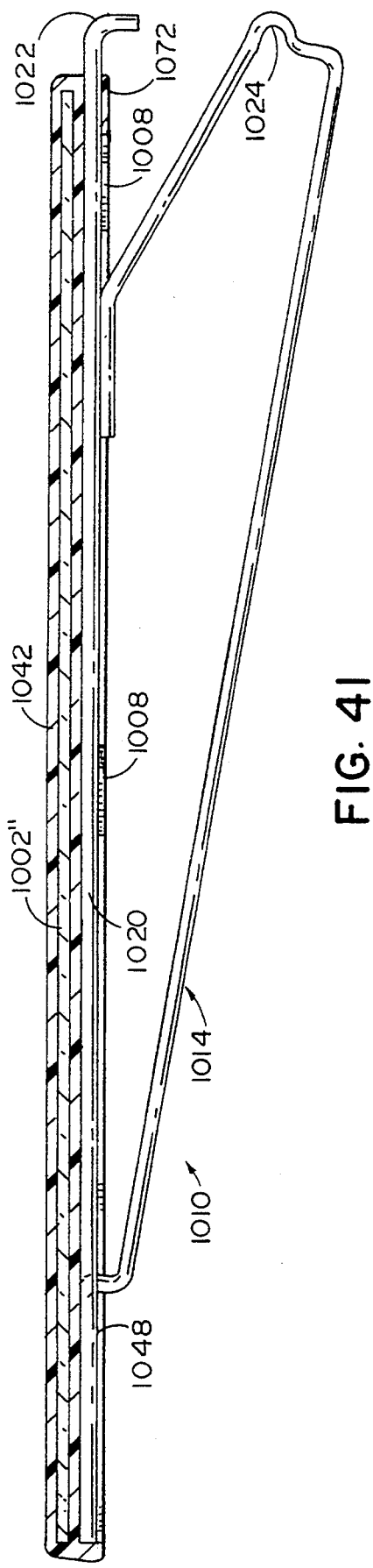
FIG. 41 is a sectional view along section line XLI—XLI of FIG. 40.

Support frame 1010 is most preferably a rigid perimeter wire frame forming a left bracket 1012 and a right bracket 1014 with a front frame member 1016 and a back frame member 1018 extending between left and right sides of the frame and connected between left bracket 1012 and right bracket 1014 (FIG. 39). Each of left bracket 1012 and right bracket 1014 is formed with a top rail 1020. Frame 1010 is preferably made from an about 3/16 inch (4.7 mm) diameter steel wire, but may also use a tubular material or other structurally suitable material. Further, frame 1010 may have a plastic construction using a suitable structural plastic of the kinds discussed in greater detail above. While shelf assembly 1000 may be supported in a fixed position in a refrigerator, shelf assembly 1000 is most preferably vertically adjustable. Each of left bracket 1012 and right bracket 1014 are therefore adapted at a back end for releasably coupling with adjustable shelf tracks 44 provided on refrigerator back wall 20 (FIGS. 39 and 41). Each of left bracket 1012 and right bracket 1014 therefore preferably have cooperating hooks 1022 and tabs 1024 for engaging shelf tracks 44.

Figure 41A:
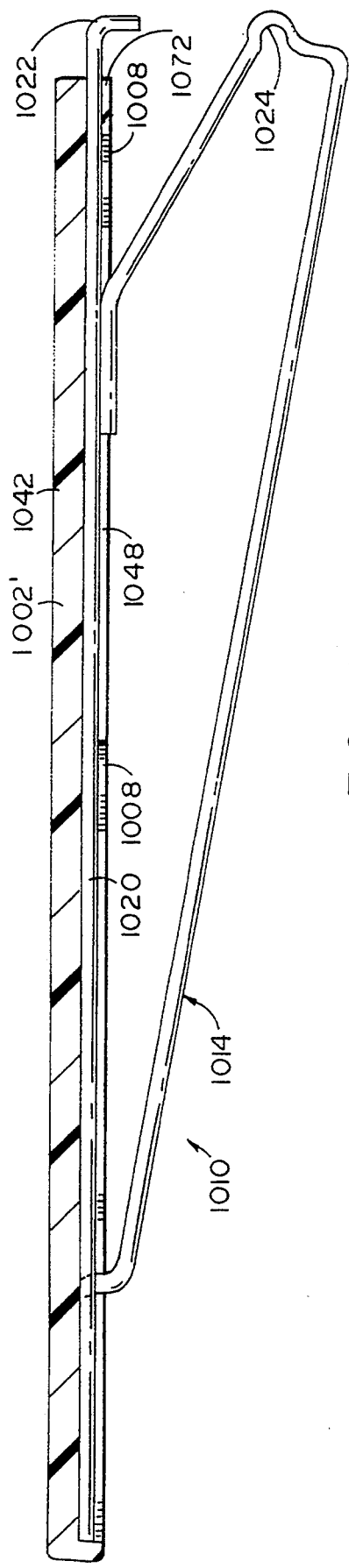
FIG. 41A is the view of FIG. 41 showing an alternative, one-piece shelf panel and perimeter rim.

Shelf panel 1002 may be formed from a light-transmitting material, preferably optically clear, tempered glass, to enhance light distribution through the refrigerator compartment, as discussed in greater detail above. However, shelf panel 1002 may also be molded in one piece with perimeter rim 1004 in a convenient one-step process (FIG. 41A). Also discussed in greater detail above, a moldable material is injected and flows into a continuous cavity mold during this process to define both shelf panel 1002' and perimeter rim 1004. Alternatively, a glass shelf panel 1002" may be held in position within a mold while a moldable material is injected and flows into the mold around perimeter edge 1004 (FIG. 41). The moldable material in either case may be any of a variety of suitable plastic materials which are structurally suitable for the application as discussed in greater detail above, including plastic materials having a coloration pigment to provide a desired color for the plastic.

Perimeter rim 1006 is most preferably molded to project above the surface of shelf panel 1002 and form a spill dam 1026 (FIGS. 42-45), but may also be molded flush with the top surface 1028 of shelf panel 1002, especially when the shelf panel and perimeter rim are molded in one piece. In either embodiment of perimeter rim 1006 being molded flush with the top surface 1028 of shelf panel 1002 or projecting above shelf panel 1002, perimeter rim 1006 is preferably formed with a left side 1040, a right side 1042, a front region 1044, and a back region 1046 and includes a lower portion 1048 which extends below shelf panel 1002.

Figure 42:
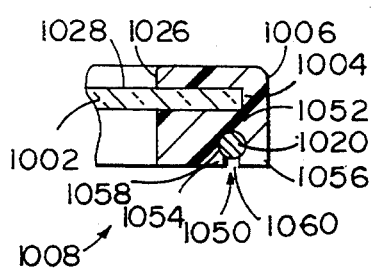
FIG. 42 is a sectional view along section line XLII—XLII of FIG. 40.
Figure 42B:
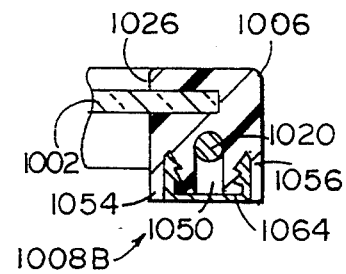
FIG. 42B is the view of FIG. 42 showing a second alternative clip embodiment.
Figure 42D:
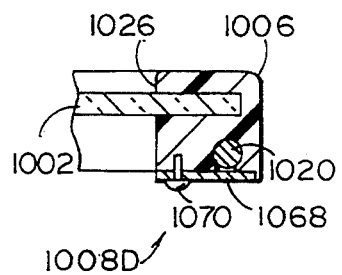
FIG. 42D is the view of FIG. 42 showing a fourth alternative clip embodiment.

In the embodiment shown in FIG. 39, preferably two clips 1008 are molded in one piece with each of left side 1040 and right side 1042 of perimeter rim 1006. Each clip 1008 defines an open-sided channel 1050 with a web 1052 interposed between two flanges 1054 and 1056 (FIGS. 42-42D). Further, channel 1050 is most preferably downwardly opening and may be configured with a seat 1058 adjacent web 1052 and a throat 1060 which is smaller than seat 1058, defining the open side of channel 1050 so that top rail 1020 of the respective left bracket 1012 or right bracket 1014 is forced through throat 1060, snaps into seat 1058, and is thereby retained in clip 1008. Seat 1058 is sized relative to top rail 1020 so that top rail 1020 is retained in seat 1058 in sliding engagement.

Figure 42A:
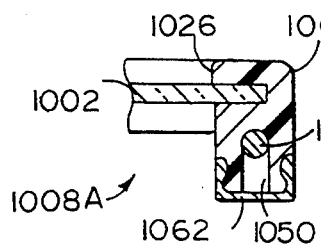
FIG. 42A is the view of FIG. 42 showing an alternative clip embodiment.
Figure 42C:
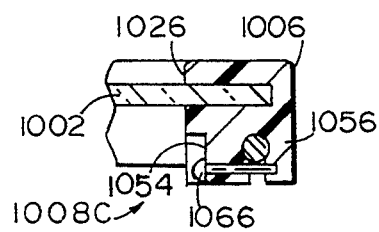
FIG. 42C is the view of FIG. 42 showing a third alternative clip embodiment.

Alternatively, a separate member may block at least a portion of the open side of channel 1050 and define a retainer for clip 1008. As shown in FIG. 42A, a generally U-shaped retainer 1062 snaps around each of flanges 1054 and 1056 and blocks the open side of channel 1050 to retain top rail 1020. A similar retainer 1064 is shown in FIG. 42B which is inserted into the ends of flanges 1054 and 1056 to block channel 1050 and retain rail 1020. A pin 1066 is shown in FIG. 42C piercing one flange 1054, extending through channel 1050 and engaging the opposing flange 1056 to block channel 1050 and retain top rail 1020. In FIG. 42D, a tab 1068 pivots about a pin 1070 to block channel 1050 and retain top rail 1020.

Figure 40:
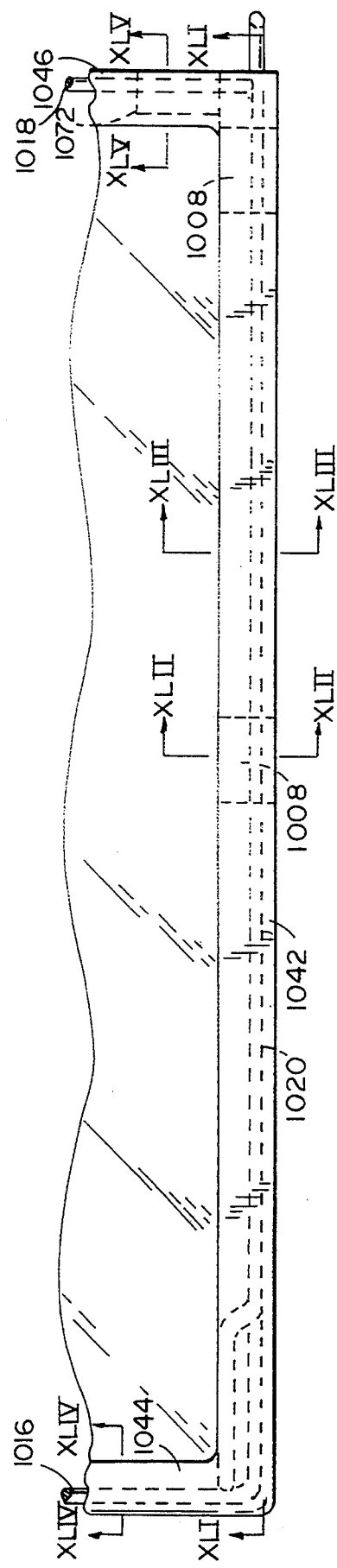
FIG. 40 is a fragmentary plan view of the shelf assembly of FIG. 39.
Figure 45:
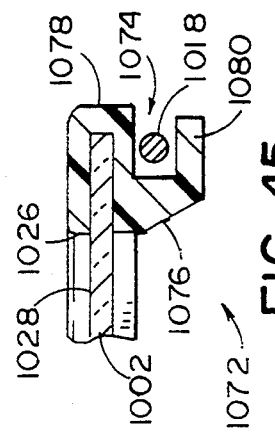
FIG. 45 is a sectional view along section line XLV—XLV of FIG. 40.
Figure 44:
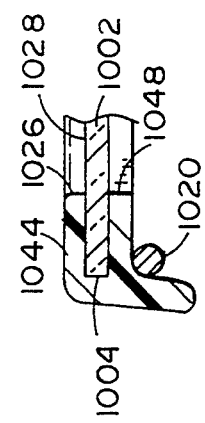
FIG. 44 is a section view along section line XLIV—XLIV of FIG. 40.
Figure 43:
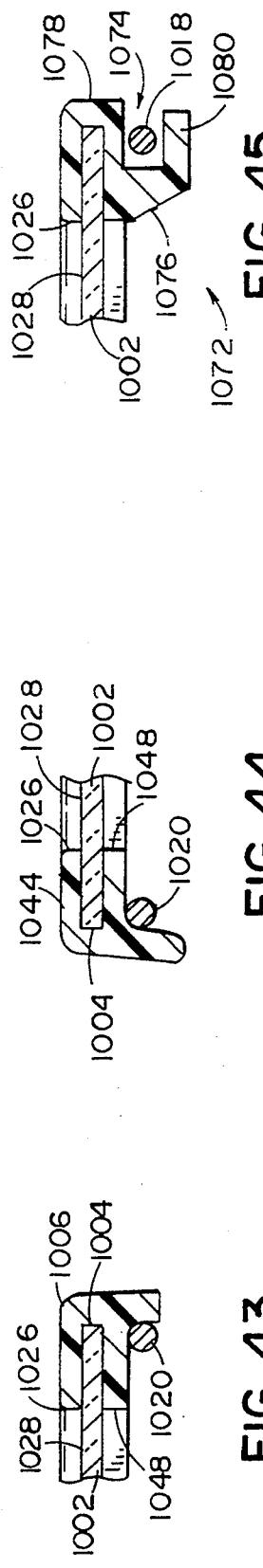
FIG. 43 is a sectional view along section line XLIII—XLIII of FIG. 40.

At least one stop 1072 and preferably a pair of stops 1072 are provided along and molded in one piece with back region 1046 of perimeter rim 1006 (FIGS. 40 and 45). Stop 1072 abuts back member 1018 to position the shelf assembly when the shelf assembly is slid from an extended position to its fully retracted position. Stop 1072 preferably defines an open-sided channel 1074 with a web 1076 interposed between two flanges 1078 and 1080. However, stop 1072 may also be provided as a downward projecting portion of rim back region 1046 by the elimination of flange 1080.

In practice, panel 1002 and perimeter rim 1006 provide a simplified snap-on panel assembly. Perimeter wire frame 1010 requires minimal manufacturing capability and is easily adapted in the manufacturing process to alternative configurations at minimal cost. Using clips 1008 molded in one piece with perimeter rim 1006, the snap-on panel assembly is easily connected with frame 1010 by pressing top rail 1020 through throat 1060 to snap top rail 1020 into seat 1058, and provides a durable and serviceable sliding refrigerator shelf assembly 1000.

Figure 46:
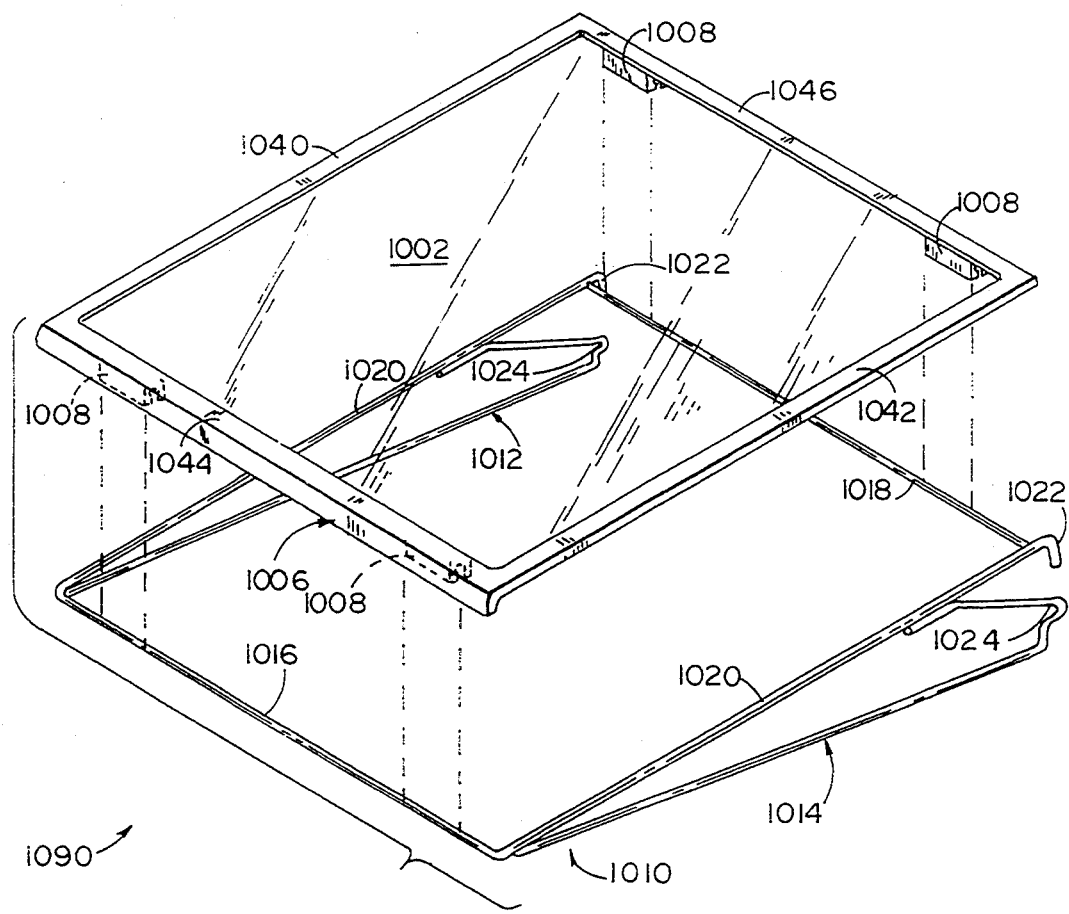
FIG. 46 is a perspective view of a seventh alternative embodiment of a shelf assembly according to the present invention.

With reference generally to drawing FIGS. 46-54, a seventh alternative embodiment of a fixed shelf assembly 1090 according to the present invention is provided by minimal modification to sliding shelf assembly 1000 by relocating clips 1008 from rim left side 1040 and right side 1042 to front region 1044 and back region 1046 (FIG. 46). Otherwise, shelf assembly 1090 preferably still includes shelf panel 1002 which may be an optically clear, tempered glass panel 1002″ with a molded perimeter rim 1006 or a one-piece panel 1002′ and perimeter rim 1006 may be used, both discussed in greater detail above. Further, the same perimeter wire frame 1010 is also preferably used.

Figure 50:
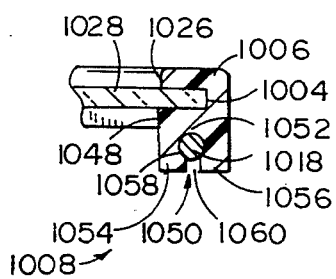
FIG. 50 is a sectional view along section line L—L of FIG. 47.
Figure 50A:
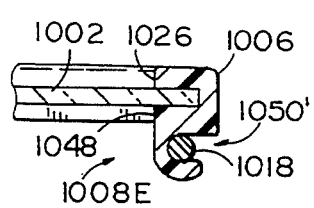
FIG. 50A is the view of FIG. 50 showing an alternative clip arrangement.
Figure 50B:
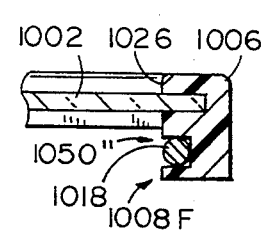
FIG. 50B is the view of FIG. 50 showing a second alternative clip arrangement.

Each clip 1008 as configured for shelf assembly 1090 still defines open-sided channel 1050 with web 1052 interposed between two flanges 1054 and 1056 (FIGS. 49-50). Again, channel 1050 is preferably configured with a seat 1058 adjacent web 1052 and a throat 1060 which is smaller than seat 1058, defining the open side of channel 1050. However, now rather than releasably coupling in sliding engagement with top rail 1020 of each of left bracket 1012 and right bracket 1014, clip 1008 as used in shelf assembly 1090 preferably releasably couples with frame front member 1016 at rim front region 1044 and frame back member 1018 at rim back region 1046 (FIGS. 46 and 49-50). Most preferably in the configuration of shelf assembly 1090, clip 1008 does not releasably couple in sliding engagement with frame 1010, but firmly engages frame 1010 to minimize any tendency for side-to-side shifting of the snap-on panel assembly relative to frame 1010. Further, while clip 1008 has generally been shown and described as having a downwardly opening channel 1050, as shown in FIGS. 50A and 50B, clip 1008 may also be configured with a rearward opening channel 1050′ when located at rim back region 1046 and the clips 1008 located on rim front region 1044 are configured with a downwardly opening channel 1050 or may be configured with a forward opening channel 1050″ when located at back region 1046 and the clips 1008 located on front region 1044 are configured with downwardly opening channels 1050. Conversely, the alternative configurations of a rearward opening clip 1008A or a forward opening clip 1008B may be located on rim front region 1044 when used in combination with a downwardly opening clip 1008 located at rim back region 1046.

Figure 48:
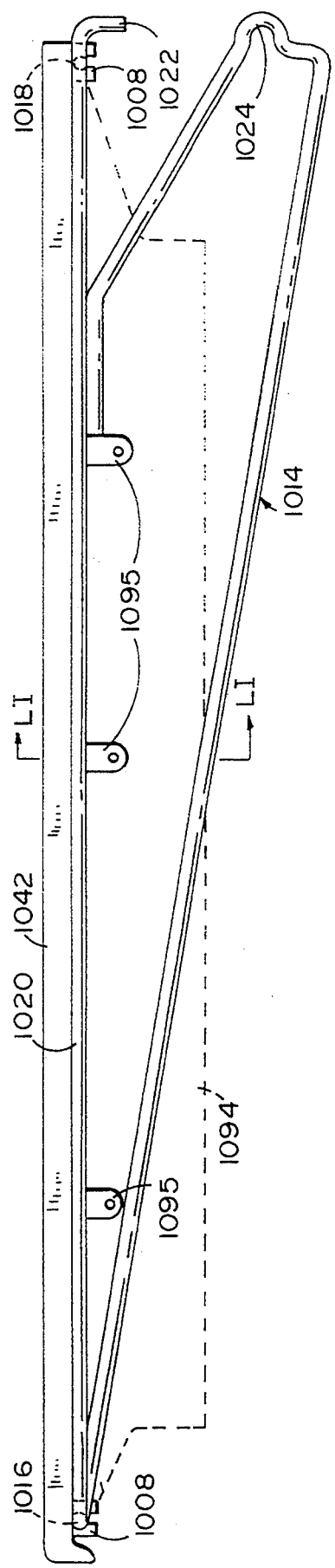
FIG. 48 is a side elevational view of the shelf of FIG. 47, showing an optional slide in phantom.
Figure 48A:
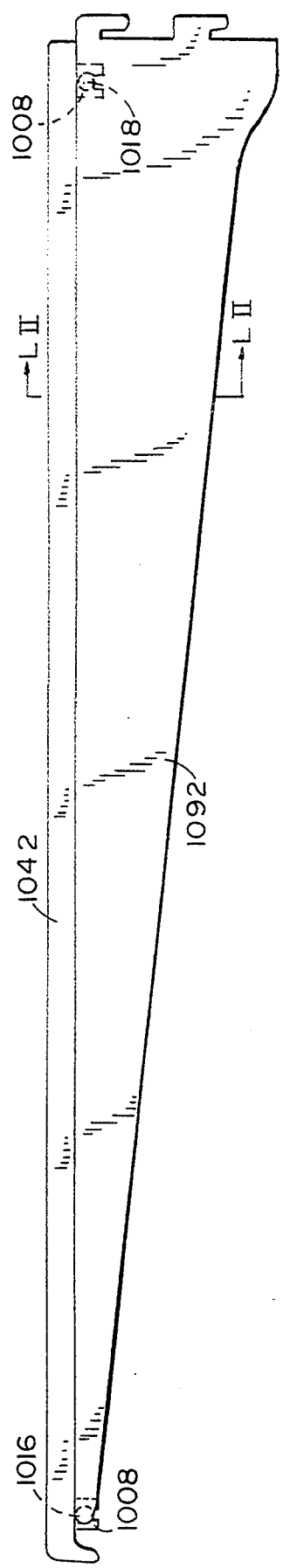
FIG. 48A is the view of FIG. 48 showing an alternative side support bracket.

While support frame 1010 is most preferably configured with a perimeter wire frame, including left bracket 1012 and right bracket 1014, the support frame may also be configured with generally triangular plate-type brackets 1092 as shown in FIGS. 48A and 52 with frame front member 1016 and back member 1018 extending and interconnecting between the plate-type brackets 1092. Further, as shown in FIGS. 48 and 51, a slide 1094 for receiving and supporting a separate member, such as a meat pan, storage bin, or drawer for example, in sliding engagement under panel 1002 may optionally be fastened with each of left bracket 1012 and right bracket 1014 (FIGS. 48 and 51) by use of tabs 1095 connected with top rail 1020 and a fastener 1093, such as a rivet or screw or by heat stacking for example. Slide 1094 may also be used with and fastened to the alternative frame brackets 1092 (FIG. 52).

Figure 53:
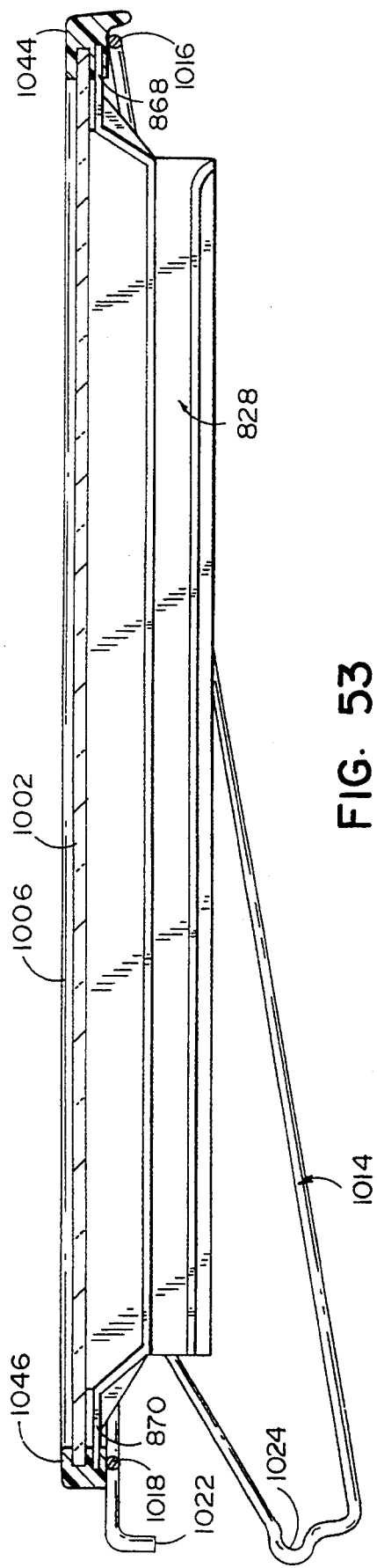
FIG. 53 is a sectional view along section line LIII—LIII of FIG. 47, showing an optional slide.
Figure 53A:
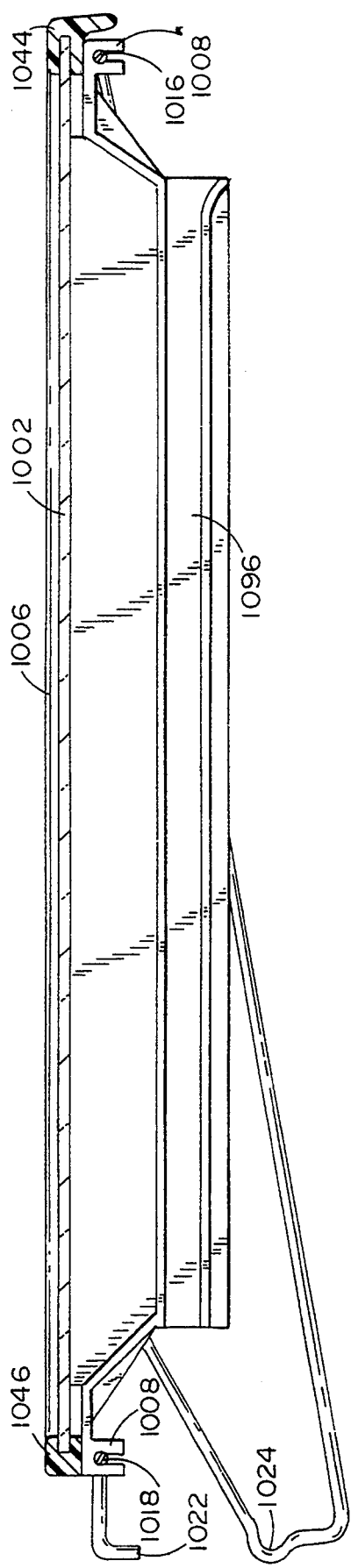
FIG. 53A is the view of FIG. 53 showing an alternative embodiment of the optional slide.

As another option, front receptacles 846 and back receptacles 852, discussed in greater detail with reference to FIGS. 27-38 above, may also be provided in rim lower portion 1048 of each of front region 1044 and back region 1046, respectively, for optional use of slide 828, also discussed above, with shelf assembly 1090 (FIG. 53). Further, a slide 1096 which is a modification of slide 828 by adding a clip 1008 to each of front tab 868 and back tab 870 of the 828 slide for releasably coupling the resulting slide 1096 with frame front member 1016 and back member 1018 (FIG. 53A) may also be used to receive and support the separate member discussed above. To accommodate placement of slide 1096 between perimeter rim 1006 and support frame 1010, a notch 1098 is made in rim lower portion 1048 of each of front region 1044 and back region 1046 at each location where use of slide 1096 is desired (FIG. 54). As shown, notch 1098 is formed with sidewalls 1100 which preclude lateral sliding of slide 1098 and the potential for a pair of slides 1098 to slide apart along frame front member 1016 and back member 1018.

Finally, one-piece molding of attachment clips 1008 with perimeter rim 1006 of shelf assembly 1090 allows simplified adaptability during manufacturing of the snap-on panel assembly to a preexisting shelf support frame 1102 as shown in FIG. 55. In the particular application to preexisting shelf support frame 1102 as shown, a clip 1008F with a forward opening channel 1050″ is provided at rim back region 1046 and releasably couples with preexisting frame back member 1018′. Rim front region 1044 is modified to accommodate preexisting frame front members 1016′ and 1016″ in this embodiment with a modified forward opening channel 1050‴. The snap-on panel assembly is easily assembled with frame 1102 by sliding clip 1008F over back member 1018′ to seat back member 1018′ in channel 1050″. Rim front region 1044 is positioned between front members 1016′ and 1016″ so that front member 1016′ engages channel 1050‴. Thus, convenient and cost-effective retrofitting of an effective spill-resistant shelf to a prior shelf unit, such as a nonspill-resistant glass panel or wire rack for example, is accommodated.

While alternative embodiments of the invention have been shown and described, other forms of this invention will now be apparent to one skilled in the art and to those who make or use the invention. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. A refrigerator shelf assembly comprising:
a removable support frame;
a shelf panel supported by said frame, said shelf panel having a top surface to support an article set thereupon and having a perimeter edge;
a perimeter rim formed separately from said shelf panel, from a moldable material, and about said perimeter edge;
a liquid tight seal between said shelf panel and said rim, said seal resisting collection of material between said shelf panel and said rim; and
a clip formed in one piece with said perimeter rim and removably coupled in snap fit engagement with said frame.

2. The shelf defined in claim 1 wherein:
said clip has a first flange; a web connected with said first flange at a first edge, said web extending generally perpendicularly away from said first flange to a second edge; and a second flange extending away from said web at said second edge, said second flange being generally parallel to said first flange;
said first flange, said web, and said second flange define an open-sided channel; and
a portion of said frame is removably received in said channel.

3. The shelf defined in claim 2 wherein at least one of said first and second flanges has a retainer and said retainer resists removal of said frame from said channel.

4. The shelf defined in claim 3 wherein said retainer is a separate member which releasably engages at least one of said flanges and blocks at least a portion of said open side of said channel.

5. The shelf defined in claim 2 wherein said channel has a seat adjacent said web and has a throat extending from said seat and defining said open side, said throat being smaller than said seat so that said frame is forced through said throat, snaps into said seat, and is retained in said seat.

6. The shelf defined in claim 1 wherein said perimeter rim includes a front rim region and an opposing back rim region and said clip is located at one of said front rim region and said back rim region.

7. The shelf defined in claim 6 wherein said frame includes a front frame member extending between a left side of said frame and a right side of said frame and a back frame member extending between said left side and said right side.

8. The shelf defined in claim 7 wherein said clip is coupled with one of said front frame member and said back frame member.

9. The shelf defined in claim 8 wherein a second of said clip is located at the other of said front rim region and said back rim region and is coupled with the other of said front frame member and said back frame member.

10. The shelf defined in claim 1 wherein:
said frame has a left bracket and a right bracket;
said panel has opposing left and right sides;
at least one of said clip is located at said left side and removably couples with said left bracket in sliding engagement so that said panel slides relative to said frame; and
at least one of said clip is located at said right side and removably couples with said right bracket in sliding engagement so that said panel slides relative to said frame.

11. The shelf defined in claim 10 wherein:
said clip has a first flange; a web connected with said first flange at a first edge, said web extending generally perpendicularly away from said first flange to a second edge; and a second flange extending away from said web at said second edge, said second flange being generally parallel to said first flange;
said first flange, said web, and said second flange define an open-sided channel; and
a portion of said frame is removably received in said channel.

12. The shelf defined in claim 11 wherein at least one of said first and second flanges has a retainer and said retainer resists removal of said bracket from said channel.

13. The shelf defined in claim 12 wherein said retainer is a separate member which releasably engages at least one of said flanges and blocks at least a portion of said open side of said channel.

14. The shelf defined in claim 11 wherein said channel has a seat adjacent said web and has a throat extending from said seat and defining said open side, said throat being smaller than said seat so that said bracket is forced through said throat, snaps into said seat, and is retained in said seat.

15. The shelf defined in claim 10 wherein said panel is tempered glass and said perimeter rim and said clip are molded of a plastic material.

16. The shelf defined in claim 15 wherein said perimeter rim projects above a top surface of said panel to define a spill dam so that liquid disposed upon said top surface is contained by said perimeter rim.

17. The shelf defined in claim 10 wherein said panel, said perimeter rim, and said clip are molded in one piece of a plastic material.

18. A refrigerator shelf comprising:
a support frame, including a front frame member extending between a left side of said frame and a right side of said frame and a back frame member extending between said left side and said right side;
a shelf panel supported by said frame and having a perimeter edge;
a perimeter rim romped about said perimeter edge, said perimeter rim including a front rim region and an opposing back rim region;
a clip formed in one piece with said perimeter rim and removably coupled with said frame, said clip being located at one of said front rim region and said back rim region and being coupled with one of said front frame member and said back frame member, respectively; and
at least one slide to receive and support a separate member in sliding engagement under said shelf panel.

19. The shelf defined in claim 18 wherein said slide removably couples with said front member and removably couples with said back member.

20. The shelf defined in claim 18 wherein:
said front rim region extends below said panel and defines at least one front receptacle;
said back rim region extends below said panel and defines at least one back receptacle corresponding to said front receptacle; and
said slide removably couples with said front receptacle and removably couples with said back receptacle.

21. The shelf defined in claim 18 wherein said frame has a left bracket and a right bracket.

22. The shelf defined in claim 21 wherein said left bracket is defined by a first perimeter wire frame and said right bracket is defined by a second perimeter wire frame.

23. The shelf defined in claim 21 wherein said left bracket is defined by a first generally planar plate member and said right bracket is defined by a second generally planar plate member.

24. The shelf defined in claim 21 further including a second slide, said one slide being fastened to one of said left and right brackets and said second slide being fastened to the other of said left and right brackets.

25. The shelf defined in claim 18 wherein said panel is tempered glass and said perimeter rim and said clip are molded of a plastic material.

26. The shelf defined in claim 25 wherein said perimeter rim projects above a top surface of said panel and defines a spill dam to contain liquid disposed upon said top surface.

27. The shelf defined in claim 18 herein said panel, said perimeter rim, and said clip are molded in one piece of a plastic material.

28. A refrigerator shelf comprising:
a shelf panel having a top surface to support an article set thereupon and having a perimeter edge;
a perimeter rim formed separately from said shelf panel, from a moldable material, and about said perimeter edge;
a liquid tight seal between said shelf panel and said rim, said seal resisting collection of material between said shelf panel and said rim; and
an attachment clip formed in one piece with said rim, said clip removably coupling with a removable frame.

29. The shelf defined in claim 28 wherein:
said clip has a first flange; a web connected with said first flange at a first edge, said web extending generally perpendicularly away from said first flange to a second edge; and a second flange extending away from said web at said second edge, said second flange being generally parallel to said first flange;
said first flange, said web, and said second flange define an open-sided channel; and
a portion of the frame is removably received in said channel.

30. The shelf defined in claim 29 wherein at least one of said first and second flanges has a retainer and said retainer resists removal of said frame from said channel.

31. The shelf defined in claim 30 wherein said retainer is a separate member which releasably engages at least one of said flanges and blocks at least a portion of said open side of said channel.

32. The shelf defined in claim 29 wherein said channel has a seat adjacent said web and has a throat extending from said seat and defining said open side, said throat being smaller than said seat so that the frame is forced through said throat, snaps into said seat, and is retained in said seat.

33. The shelf defined in claim 28 wherein said perimeter rim includes a front rim region and an opposing back rim region and wherein said clip is located at one of said front rim region and said back rim region.

34. The shelf defined in claim 33 wherein a second of said clip is located at the other said front rim region and said back rim region.

35. The shelf defined in claim 33 further including at least one slide for receiving and supporting a separate member in sliding engagement under said panel.

36. The shelf defined in claim 35 wherein:
said front rim region extends below said panel and defines at least one front receptacle;
said back rim region extends below said panel and defines at least one back receptacle corresponding to said front receptacle; and
said slide removably couples with said front receptacle and removably couples with said back receptacle.

37. The shelf defined in claim 35 wherein said panel is tempered glass and said perimeter rim and said clip are molded of a plastic material.

38. The shelf defined in claim 37 wherein said perimeter rim projects above a top surface of said panel to define a spill dam so that liquid disposed upon said top surface is contained by said perimeter rim.

39. The shelf defined in claim 35 wherein said panel, said perimeter rim, and said clip are molded in one piece of a plastic material.

40. The shelf defined in claim 28 wherein said perimeter rim includes a left side and an opposing right side and at least one of said attachment clip is located at said left side and at least a second of said attachment clip is located at said right side.

41. The shelf defined in claim 40 wherein:
said clip has a first flange; a web connected with said first flange at a first edge, said web extending generally perpendicularly away from said first flange to a second edge; and a second flange extending away from said web at said second edge, said second flange being generally parallel to said first flange;
said first flange, said web, and said second flange define an open-sided channel; and
a portion of the frame is removably received in said channel.

42. The shelf defined in claim 41 wherein at least one of said first and second flanges has a retainer and said retainer resists removal of said bracket from said channel.

43. The shelf defined in claim 42 wherein said retainer is a separate member which releasably engages at least one of said flanges and blocks at least a portion of said open side of said channel.

44. The shelf defined in claim 41 wherein said channel has a seat adjacent said web and has a throat extending from said seat and defining said open side, said throat being smaller than said seat so that the portion of the frame is forced through said throat, snaps into said seat, and is retained in said seat.

45. A refrigerator shelf assembly comprising:

a removable frame, having a first frame member extending along a first axis and having a second frame member extending along a second axis, said second axis being one of spaced from or angled relative to said first axis;

a shelf panel supported by said frame, said panel having a top surface to support an article set thereupon and having an edge;

a rim extending along a length of said edge;

a first clip romped in one piece with said rim and coupled in snap fit engagement with said first frame member; and a second clip formed in one piece with said rim and coupled in snap fit engagement with said second frame member.

46. The shelf defined in claim 45 wherein each of said clips has a web portion and a pair of opposing flange portions defining an open-sided channel, a portion of said frame being removably received in said channel.

47. The shelf defined in claim 46 wherein at least one of said pair of flanges has a retainer which resists removal of said frame from said channel.

48. The shelf defined in claim 46 wherein said channel has a seat adjacent said web and a throat extending from said seat, said throat defining said open side, said throat being smaller than said seat so that said frame is forced through said throat, snaps into said seat, and is retained in said seat.

49. The shelf defined in claim 46 wherein said shelf panel has a first edge and an opposing second edge, said first clip is located at said first edge and said second clip is located at said second edge.

50. The shelf defined in claim 45 wherein:
said frame has a left bracket and a right bracket;
said panel has opposing left and right sides;
at least one of said clips is located at said left side and removably couples with said left bracket in sliding engagement so that said panel slides relative to said frame; and
at least a second of said clips is located at said right side and removably couples with said right bracket in sliding engagement so that said panel slides relative to said frame.

51. The shelf defined in claim 50 wherein each of said one and said second clips have a web portion and a pair of opposing flange portions defining an open-sided channel, a portion of said frame being removably received in said channel.

52. The shelf defined in claim 51 wherein at least one of said pair of flanges has a retainer which resists removal of said frame from said channel.

53. The shelf defined in claim 51 wherein said channel has a seat adjacent said web and a throat extending from said seat, said throat defining said open side, said throat being smaller than said seat so that said bracket is forced through said throat, snaps into said seat, and is retained in said seat.

54. The shelf defined in claim 50 wherein said panel is tempered glass and said perimeter rim and said clips are molded of a plastic material.

55. The shelf defined in claim 54 wherein said perimeter rim projects above a top surface of said panel to define a spill dam so that liquid disposed upon said top surface is contained by said perimeter rim.

56. The shelf defined in claim 50 wherein said panel, said perimeter rim, and said clips are molded in one piece of a plastic material.

57. A refrigerator shelf comprising:

a frame having a first frame member extending along a first axis, between a left side of said frame and a right side of said frame, and having a second frame member extending along a second axis, between said left side of said frame and said right side of said frame, said second axis being one of spaced from or angled relative to said first axis;

a shelf panel supported by said frame, said panel having an edge incorporating a first panel edge and an opposing second panel edge;

a rim extending along a length of said edge;

a first clip formed in one piece with said rim, located at said first panel edge, and coupled with said first frame member;

a second clip formed in one piece with said rim, located at said second panel edge, and coupled with said second frame member; each of said first clip and said second clip having a web portion and a pair of opposing flange portions defining an open-sided channel, a portion of said first frame member being removably received in said channel of said first clip and a portion of said second frame member being removably received in said channel of said second clip;

a third clip located at said first panel edge, each of said first and third clips being coupled with said first frame member; and a fourth clip located at said second panel edge, each of said second and fourth clips being coupled with said second frame member, each of said first and second clips being near said left side, each of said third and fourth clips being near said right side.

58. The shelf defined in claim 57 further including at least one slide for receiving and supporting a separate member in sliding engagement under said panel.

59. The shelf defined in claim 58 wherein said panel is tempered glass and each of said clips and said perimeter rim are molded of a plastic material, in one piece.

60. The shelf defined in claim 59 wherein said edge of said panel is a perimeter edge and said rim is a perimeter rim, said perimeter rim circumscribing said panel at said perimeter edge.

61. The shelf defined in claim 60 wherein said perimeter rim projects above a top surface of said panel and defines a spill dam to contain liquid disposed upon said top surface.

62. The shelf defined in claim 57 wherein said panel, said rim, and each of said clips are molded in one piece of a plastic material.

63. The shelf defined in claim 58 wherein each of said first, second, third, and fourth clips defines an open-sided channel with said open side facing one of away from said shelf panel, away from one of said first frame member and said second frame member, and toward one of said first frame member and said second frame member.

64. A refrigerator shelf assembly comprising:

a removable frame having a first frame member extending along a first axis and having a second frame member extending along a second axis, said second axis being one of spaced from or angled relative to said first axis;

a shelf panel supported by said frame, said shelf panel having a top surface to support an article set thereupon and having an edge; and a rim extending along a length of said edge, said rim having a first web portion and having a first pair of flange portions extending in the same general direction from opposite sides of said first web portion to define a first clip, said first clip being coupled with said first frame member in snap fit engagement said rim having a second web portion and having a second pair of flange portions extending in the same general direction from opposite sides of said second web portion to define a second clip, said second clip being coupled with said second frame member in snap fit engagement.

65. The shelf defined in claim 64 wherein said first frame member is removably received in said first clip and said second frame member is removably received in said second clip.

66. The shelf defined in claim 65 wherein said edge has a first edge portion; said edge has a second edge portion, opposite first edge portion; said rim has a first rim region extending along said first edge portion; and said rim has a second rim region extending along said second edge portion.

67. The shelf defined in claim 66 wherein said edge is a perimeter edge which incorporates each of said first edge portion and said second edge portion and wherein said rim is a perimeter rim which incorporates each of said first rim region and said second rim region, said perimeter rim circumscribing said panel at said perimeter edge.

68. The shelf defined in claim 67 wherein said perimeter rim projects above a top surface of said panel and defines a spill dam to contain liquid upon said top surface.

69. The shelf defined in claim 68 wherein each of said first clip and said second clip is molded in one piece with said rim.

70. The shelf defined in claim 69 wherein each of said first clip and said second clip defines an open-sided channel with said open side of said first clip facing one of away from said panel, away from said second frame member, and toward said second frame member and with said open side of said second clip facing one of away from said panel, away from said first frame member, and toward said first frame member.

* * * * *